US011238412B2

(12) United States Patent
Gurdin et al.

(10) Patent No.: US 11,238,412 B2
(45) Date of Patent: Feb. 1, 2022

(54) MULTIMEDIA CALENDAR

(71) Applicant: Microsoft Technology Licensing, LLC, Redmond, WA (US)

(72) Inventors: Boaz Nathaniel Gurdin, Palo Alto, CA (US); Erez Kikin Gil, Bellevue, WA (US); Asta J. Roseway, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 15/862,290

(22) Filed: Jan. 4, 2018

(65) Prior Publication Data

US 2018/0136954 A1 May 17, 2018

Related U.S. Application Data

(63) Continuation of application No. 11/766,526, filed on Jun. 21, 2007, now Pat. No. 10,956,874.

(51) Int. Cl.
*G06Q 10/10* (2012.01)
*G06F 3/0481* (2013.01)
(Continued)

(52) U.S. Cl.
CPC ......... *G06Q 10/109* (2013.01); *G06F 3/0482* (2013.01); *G06F 3/04817* (2013.01); *G06F 3/04842* (2013.01)

(58) Field of Classification Search
CPC ............... G06Q 10/10; G06Q 10/1093; G06Q 10/0631; G06Q 10/06311;
(Continued)

(56) References Cited

U.S. PATENT DOCUMENTS 4,819,191 A 4/1989 Scully et al.
5,936,625 A 8/1999 Kahl et al.
(Continued)

FOREIGN PATENT DOCUMENTS

WO 2006017622 A2 2/2006

OTHER PUBLICATIONS

Hartford et al., Web-Based Systems for Communication and Scheduling, Jan. 1, 2003, IEEE International Professional Communication Conference, 2003, pp. 201-208 (Year: 2003).*

(Continued)

*Primary Examiner* — Robert D Rines
(74) *Attorney, Agent, or Firm* — Schwegman Lundberg & Woessner, P.A.

(57) ABSTRACT

A method for creating events for use by an electronic calendar application. A computer device running a calendar application displays a GUI having a representation of a calendar. A first widget on the GUI initiates a software routine for defining an event. The routine generates an interface window having a plurality of event detail widgets which allow the user to interactively define details of the event. Once the details are entered, the event is saved as a multimedia object, and the multimedia object is placed onto the calendar representation. Further, details of the event may include additional multimedia content. Also, the calendar representation itself may include multimedia content. The event may be defined with an approximate time frame rather than a specific time frame. For example, an event may be linked to another event rather than to a specific time frame.

20 Claims, 24 Drawing Sheets

(51) Int. Cl.
*G06F 3/0482* (2013.01)
*G06F 3/0484* (2013.01)

(58) Field of Classification Search
CPC .......... G06Q 10/063116; G06Q 10/00; G06Q 30/02; G06Q 10/109; G06Q 10/06; G06Q 10/06314; G06F 17/243; G06F 3/04817; G06F 3/0482; G06F 3/04842; G06F 9/451
USPC ......... 704/10; 705/7.19, 7.11–7.42; 709/228; 715/748, 751
See application file for complete search history.

(56) References Cited

U.S. PATENT DOCUMENTS

| | | | |
|---|---|---|---|
| 6,016,478 A * | 1/2000 | Zhang | G06Q 10/06314 705/7.19 |
| 6,186,553 B1 | 2/2001 | Phillips et al. | |
| 6,199,099 B1 | 3/2001 | Gershman et al. | |
| 6,232,970 B1 | 5/2001 | Bodnar et al. | |
| 6,380,959 B1 * | 4/2002 | Wang | G06Q 10/109 715/853 |
| 6,717,589 B1 | 4/2004 | Grillo et al. | |
| 6,828,989 B2 | 12/2004 | Cortright | |
| 7,174,517 B2 | 2/2007 | Barnett et al. | |
| 7,370,282 B2 * | 5/2008 | Cary | G06Q 10/109 715/772 |
| 7,703,048 B2 | 4/2010 | Alford, Jr. et al. | |
| 7,805,676 B2 | 9/2010 | Schemers et al. | |
| 8,352,341 B1 | 1/2013 | Greenberg et al. | |
| 2002/0075303 A1 | 6/2002 | Thompson et al. | |
| 2002/0131565 A1 | 9/2002 | Scheuring et al. | |
| 2002/0154178 A1 | 10/2002 | Barnett et al. | |
| 2003/0002390 A1 * | 1/2003 | Sellen | G06Q 10/109 368/12 |
| 2003/0146854 A1 | 8/2003 | Jones | |
| 2003/0182170 A1 | 9/2003 | Meunitz | |
| 2003/0204474 A1 | 10/2003 | Capek et al. | |
| 2004/0064567 A1 * | 4/2004 | Doss | G06Q 10/063114 709/228 |
| 2004/0085578 A1 * | 5/2004 | Quek | G06Q 30/02 358/1.18 |
| 2004/0104937 A1 | 6/2004 | An | |
| 2004/0122661 A1 * | 6/2004 | Hawkinson | G06F 17/2785 704/10 |
| 2004/0128353 A1 | 7/2004 | Goodman et al. | |
| 2004/0225969 A1 | 11/2004 | Droegemueller et al. | |
| 2004/0264301 A1 | 12/2004 | Howard et al. | |
| 2005/0005249 A1 | 1/2005 | Hill et al. | |
| 2005/0091095 A1 * | 4/2005 | Wilbrink | G06Q 10/06312 705/7.19 |
| 2005/0222971 A1 * | 10/2005 | Cary | G06Q 10/109 |
| 2005/0228677 A1 | 10/2005 | Mccabe et al. | |
| 2005/0260974 A1 | 11/2005 | Lee et al. | |
| 2005/0278641 A1 | 12/2005 | Mansour et al. | |
| 2006/0026051 A1 | 2/2006 | Rose | |
| 2006/0116918 A1 | 6/2006 | Flora et al. | |
| 2006/0149778 A1 | 7/2006 | Clover | |
| 2006/0265263 A1 * | 11/2006 | Burns | G06Q 10/109 705/80 |
| 2006/0277087 A1 | 12/2006 | Error | |
| 2007/0061488 A1 | 3/2007 | Alagappan et al. | |
| 2007/0067342 A1 * | 3/2007 | Haralambopoulos | G06Q 10/109 |
| 2007/0168892 A1 * | 7/2007 | Brush | G06Q 10/109 715/751 |
| 2007/0260503 A1 | 11/2007 | Pan et al. | |
| 2007/0260989 A1 * | 11/2007 | Vakil | G06Q 10/109 715/748 |
| 2007/0300163 A1 * | 12/2007 | Alford | G06Q 10/109 715/751 |
| 2008/0295017 A1 | 11/2008 | Tseng et al. | |
| 2008/0319818 A1 | 12/2008 | Gurdin et al. | |
| 2010/0017371 A1 | 1/2010 | Whalin et al. | |

OTHER PUBLICATIONS

"Non Final Office Action Issued in U.S. Appl. No. 11/766,526", dated Jan. 10, 2018, 29 Pages.
"HyperCalendar 2", Retrieved From: https://web.archive.org/web/20070205064220/http://hypercalendar.foryoursoft.com/, Retrieved Date: Feb. 20, 2007, 3 Pages.
"Nortel Multimedia Client for IBM Lotus Notes", Retrieved From: https://web.archive.org/web/20070309204158/http://www.nortel.com:80/solutions/multimediacomm/collateral/nn120280.pdf, Retrieved Date: Mar. 9, 2007, 4 Pages.
"Welcome to KalendraTM, Your Personal Multimedia Life Organizer!", Retrieved From: https://web.archive.org/web/20070209123820/http://kalendra.com, Retrieved Date: Feb. 20, 2007, 3 Pages.
"Final Office Action Issued in U.S. Appl. No. 11/766,526", dated Jul. 15, 2011, 23 Pages.
"Final Office Action Issued in U.S. Appl. No. 11/766,526", dated May 4, 2015, 24 pages.
"Final Office Action Issued in U.S. Appl. No. 11/766,526", dated Oct. 20, 2016, 32 Pages.
"Non Final Office Action Issued in U.S. Appl. No. 11/766,526", dated Nov. 24, 2010, 23 Pages.
"Non Final Office Action Issued in U.S. Appl. No. 11/766,526", dated Jul. 18, 2014, 25 Pages.
"Non Final Office Action Issued in U.S. Appl. No. 11/766,526", dated Apr. 8, 2016, 30 Pages.
"Final Office Action Issued in U.S. Appl. No. 11/766,526", dated Aug. 31, 2018, 27 Pages.
"Appeal Brief Filed in U.S. Appl. No. 11/766,526", filed Dec. 19, 2018, 18 Pages.
"Tasks and Time Management in Outlook", Retrieved From: https://blogs.msdn.microsoft.com/melissamacbeth/2006/02/17/hank-leukart-on-color-categories/, Feb. 17, 2006, 4 Pages.
"Stay on Top of Your E-mail With Outlook 2007", Retrieved From: https://web.archive.org/web/20170602165551/https://products.office.com/en-in/microsoft-outlook-2007, Jun. 3, 2017, 8 Pages.
"Assign a Color Category to a Calendar Appointment, Meeting, or Event", Retrieved From: https://support.office.com/en-us/article/assign-a-color-category-to-a-calendar-appointmentmeeting-or-event-750596d9-707d-4412-8c0e-7fdc0fc52527, Aug. 20, 2018, 5 Pages.
"Non Final Office Action Issued in U.S. Appl. No. 11/766,526", dated May 2, 2019, 21 Pages.
"Final Office Action Issued in U.S. Appl. No. 11/766,526", dated Oct. 4, 2019, 29 Pages.
"Non-Final Office Action issued in U.S. Appl. No. 11/766,526", dated May 20, 2020, 35 Pages.

* cited by examiner

MULTIMEDIA CALENDAR

CLAIM OF PRIORITY

This patent application is a continuation of U.S. application Ser. No. 11/766,526, filed on Jun. 21, 2007, which is incorporated herein by reference in its entirety.

BACKGROUND

Electronic calendar applications are well known as a tool for organizing, tracking and managing appointments and events, and may generally be run on any type of computer-based platform, including desktop, hand-held, network, etc. A typical electronic calendar application provides a graphical user interface ("GUI") having a representation of a calendar. The user may select from different views to display a different time period view, such as a day, a week, a month, etc.

A typical GUI for a calendar application is displayed as a rectangular grid where text, e.g., information about events or appointments, can be associated with time blocks. The grid may be presented in several common visual formats, such as a daily, weekly, or monthly view. For example, the grid may be laid out as a series of columns, one for each day, each column being divided into blocks of time, such as hourly increments.

The rectangular grid approach works well for scheduling formal meetings and appointments. However, many events are not tied to specific time blocks, and traditional calendar approaches do not have the flexibility to represent such events in a non-traditional manner. For example, text and rectangular time blocks are not visually appealing or emotionally engaging. Thus, in a calendar application that permits an event organizer to define an event and then send invitations to others, the event invitation appears boring and therefore does nothing (by itself) to generate interest in attending the event. Further, the text of event titles tends to look similar, so it is difficult to browse the calendar for specific events or types of events, like a birthday party. Also, text may not be the best type of representation of relevant information for the event. Text also does not provide any interactivity, which may be desirable depending on the type of event being scheduled.

The use of rectangular time blocks also forces users to specify exact start and end times for an event. However, events are sometimes less structured. For example, an open house might be scheduled for "Sunday evening" rather than from 7 pm to 10 pm, or an extreme surfing contest might be scheduled to begin "when the ocean swells exceed 10 feet." Such indefiniteness cannot be well represented in the traditional grid calendar format. In addition, the use of rectangular time blocks may not show all related parts of an event, such as travel time, or dinner followed by entertainment.

SUMMARY

The present disclosure describes methods for creating events for use by an electronic calendar application. A graphical user interface ("GUI") having a representation of a calendar is provided, and the GUI includes at least a first widget adapted for initiating a routine to define an event, e.g., a new event button. When the first widget is selected, a software routine is initiated to define the event. In one embodiment, a first interface window having a plurality of event detail widgets is provided. The event detail widgets allow the user to interactively define details of the event. Once the details are entered, the event is saved as a multimedia object. Further, the multimedia object may be represented by an icon, and the object and its icon which is placed onto the calendar representation at the time(s) entered into the event detail widgets.

In one embodiment, additional widgets are provided to associate the event with an approximate time frame rather than specific times. Approximate time frames may be shown on the calendar representation by non-rectangular borders. In another embodiment, additional widgets are provided to associate the event with another event. In yet another embodiment, additional widgets are provided to associate other multimedia objects either with a specific event, or with the calendar. For example, RSS feeds or any other type of multimedia content could be linked to the calendar.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present disclosure describes methods and systems for defining events in an electronic calendar. In general, the methods and systems allow events to be defined with a temporal sense, as in conventional calendars, but with less restriction as to how the event can be formatted or represented on the calendar. For example, the inclusion of multimedia content with a defined event gives one the ability to describe the event in tremendous detail, or to provide related information, or to provide links to other content. Likewise, the event need not be defined to have specific start and end times that fit nicely in a rectangular time grid, but can be represented with non-rectangular borders to represent an approximate time frame. In one embodiment, events are represented on the calendar as multimedia icons. Likewise, each calendar may itself be represented as an icon, for example, when calendars are shared with others.

The described embodiments generally contemplate a software "gadget" approach to implementing the disclosed methods and systems, i.e., a small, single-purpose application, such as a calendar application, that either resides on a user's desktop or is hosted on a web page. For example, a "web gadget" may be run from a web site, such as live.com, or a "sidebar gadget" may be run from the user's desktop. User interaction with the calendar application thus takes a web-based approach with a series of user interfaces being provided to define events and save them to the user's calendar. The calendar application could also be implemented as a stand-alone program.

Figure 1:
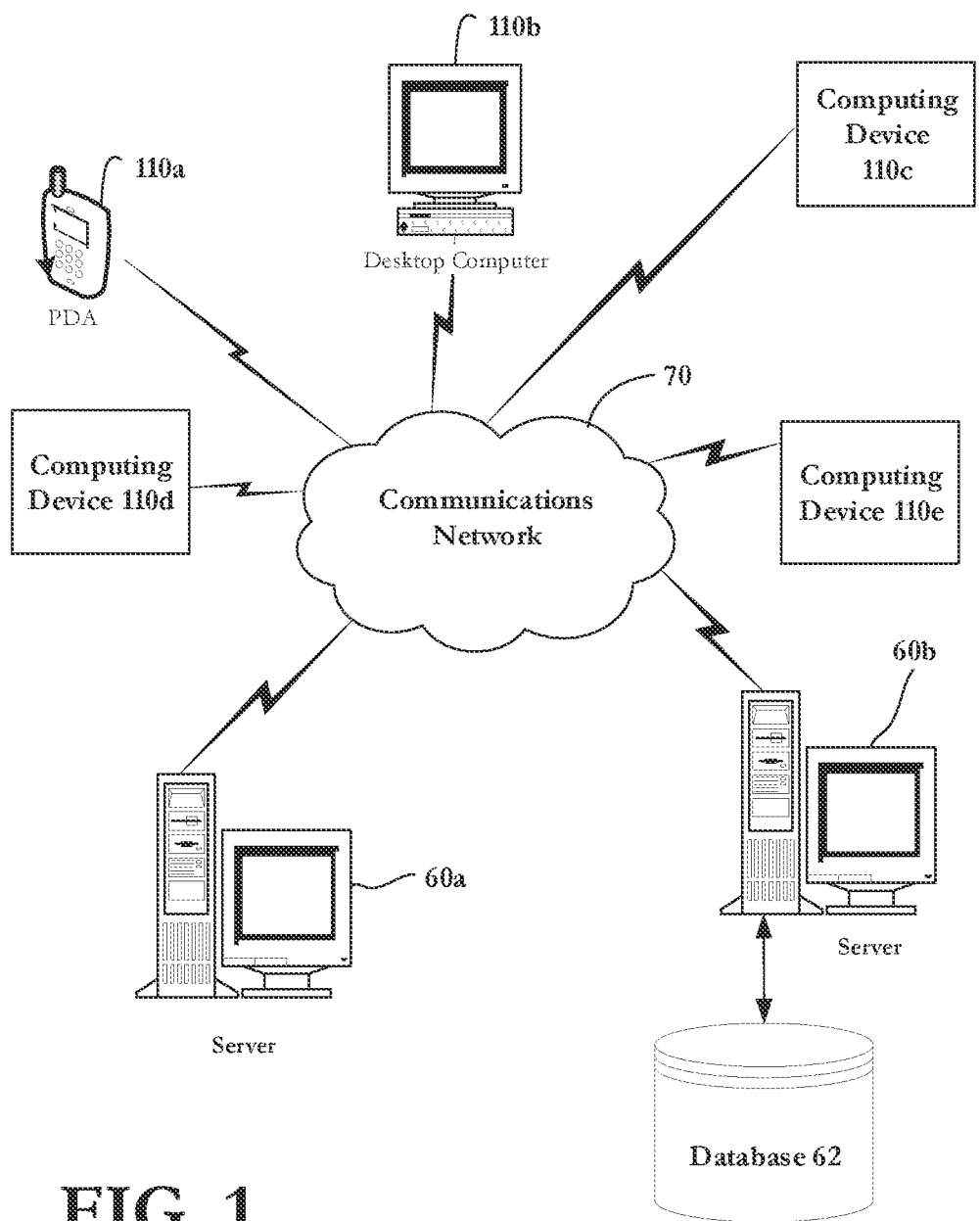
FIG. 1 is a block diagram illustrating an embodiment of a communications network that couples multiple computing devices.
Figure 2:
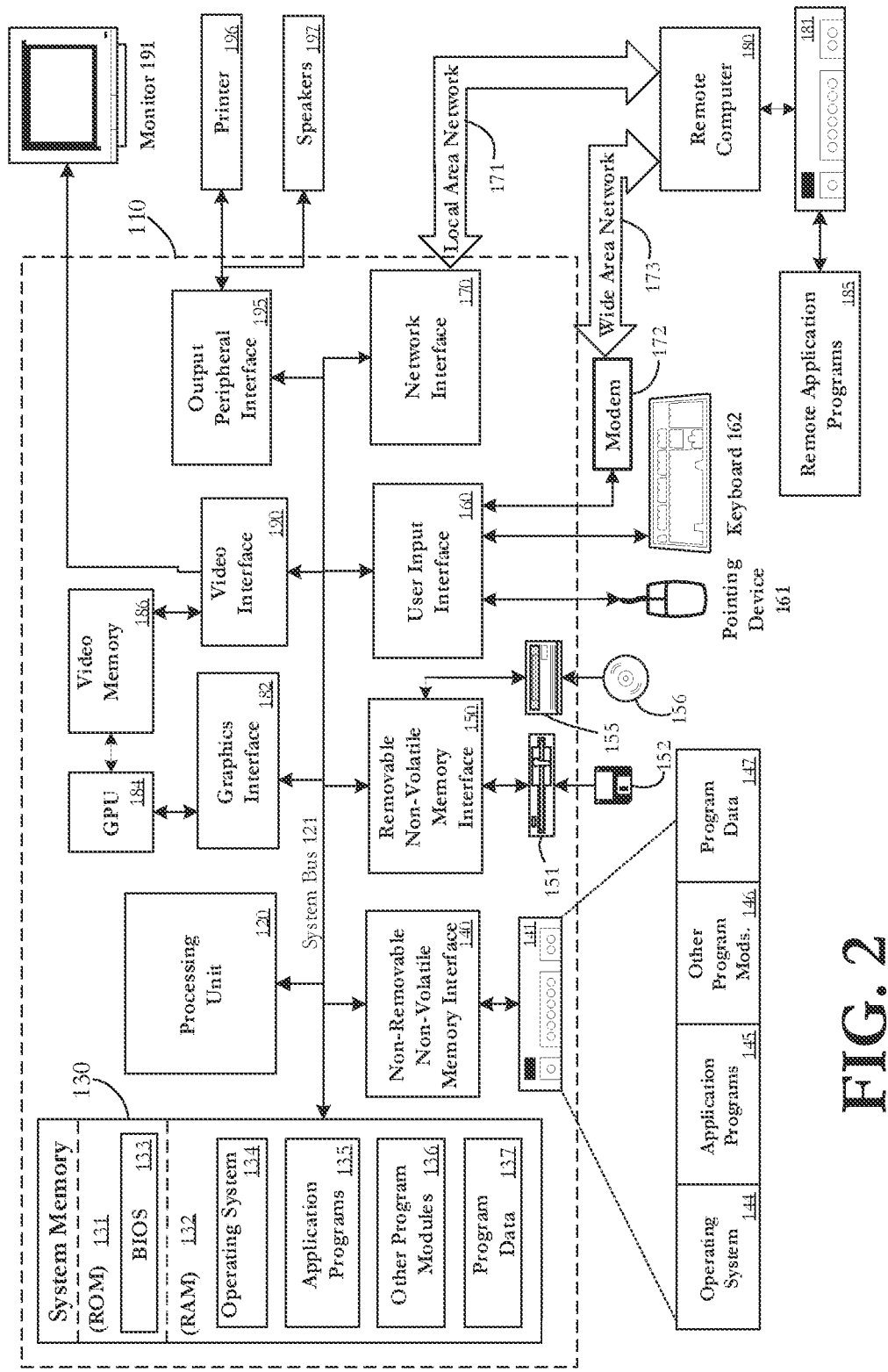
FIG. 2 is a block diagram illustrating an embodiment of a typical computing environment.

FIG. 1 illustrates one example of a network-based system in which the techniques of this disclosure may be implemented. Thus, a number of computing devices may be coupled to a communications network 70, including a personal digital assistant ("PDA") 110a, a desktop computer 110b, other computing devices 110c, 110d, 110e, and servers 60a, 60b. FIG. 2 illustrates a general computing system environment 100 in which any of the computer-based devices shown in FIG. 1 or otherwise described herein may be implemented. FIGS. 1 and 2 are described in more detail at the end of this disclosure. The computing system environment 100 is only one example of a suitable computing environment and is not intended to suggest any limitation as to the scope of use or functionality of the system. The computing environment 100 should not be interpreted as having any dependency or requirement relating to any one or combination of components illustrated in the exemplary operating environment 100. One of ordinary skill in the art can appreciate that the techniques disclosed herein can be implemented in connection with any computer or other client or server device, which can be deployed as part of a computer network, or in a distributed computing environment, and utilizing local or remote storage.

While some exemplary embodiments herein are described in connection with software residing on a computing device, one or more portions of the systems and processes described herein may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as .NET code, and in other distributed computing frameworks as well.

As previously noted, the calendar application may be implemented on any client device, such as PDA 110a or desktop computer 110b, or on any other computing device, or over a network. When implemented on a client device such as PDA 110a or desktop computer 110b, the calendar application is typically implemented as a client application, such that the client application reads and writes calendar data from the client device memory. When implemented over a network, at least a portion of the user data for the calendar application may be stored on a remote server. In that case, the calendar application may be hosted on a remote server and accessed through a browser application on the client device thereby providing a content page to the client device for display. In the case of a browser application, the content page may provide the user interface for the calendar application. The calendar application may also generate a user interface that allows the user to schedule and share events with other users only when provided over a network.

Figure 3A:
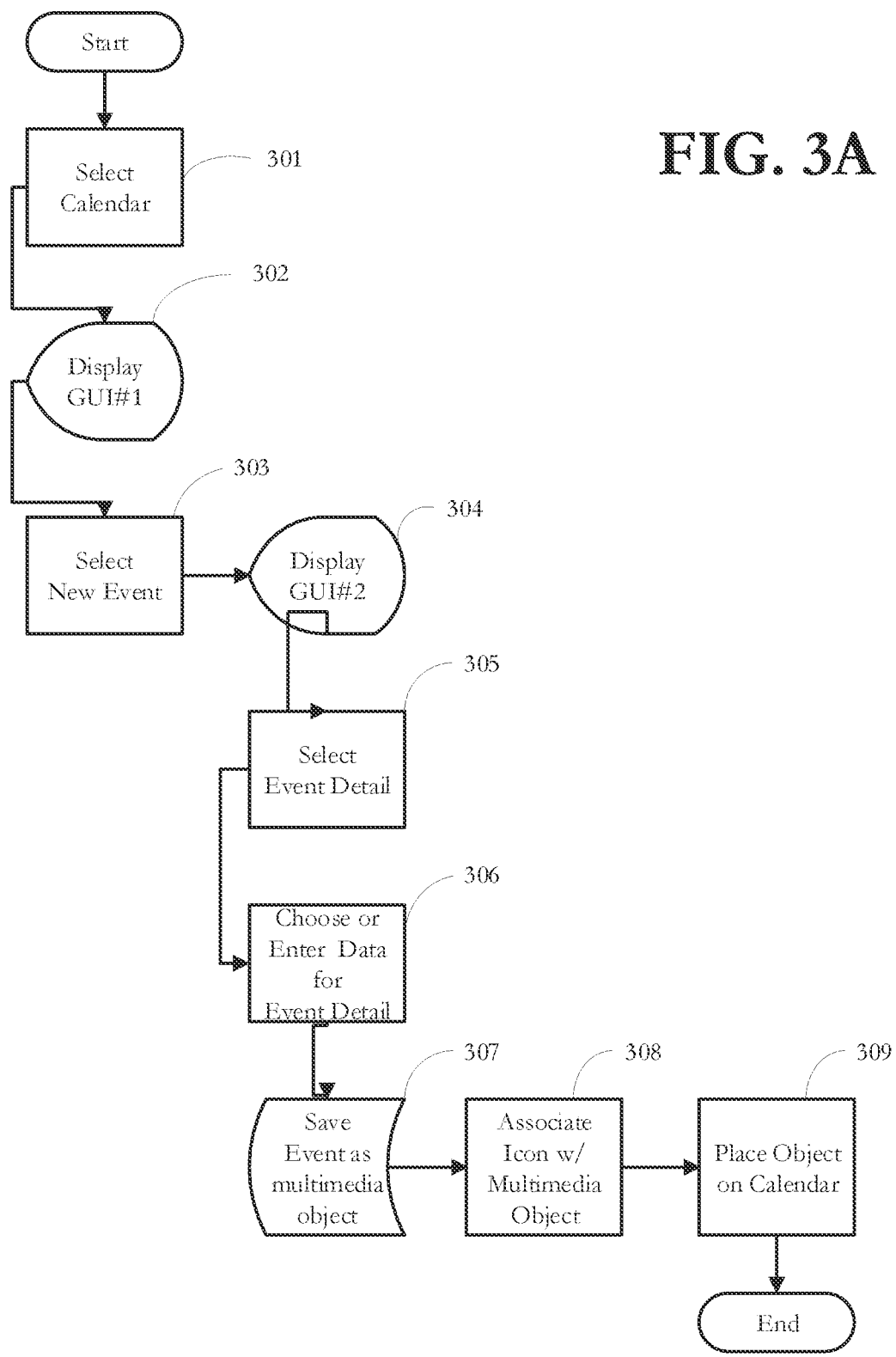
FIGS. 3A-3C are flowcharts describing various methods for creating a new event in a calendar application.

FIG. 3A illustrates a simplified process for defining a new event from the user's perspective as part of a software calendar application or "gadget" on a computer-based device. The calendar application may be implemented as part of a client application on a user device, or hosted by a remote server and accessed by a client device over a network. For example, a calendar application may be one of many gadgets included on a user PDA or desktop.

Figure 5A:
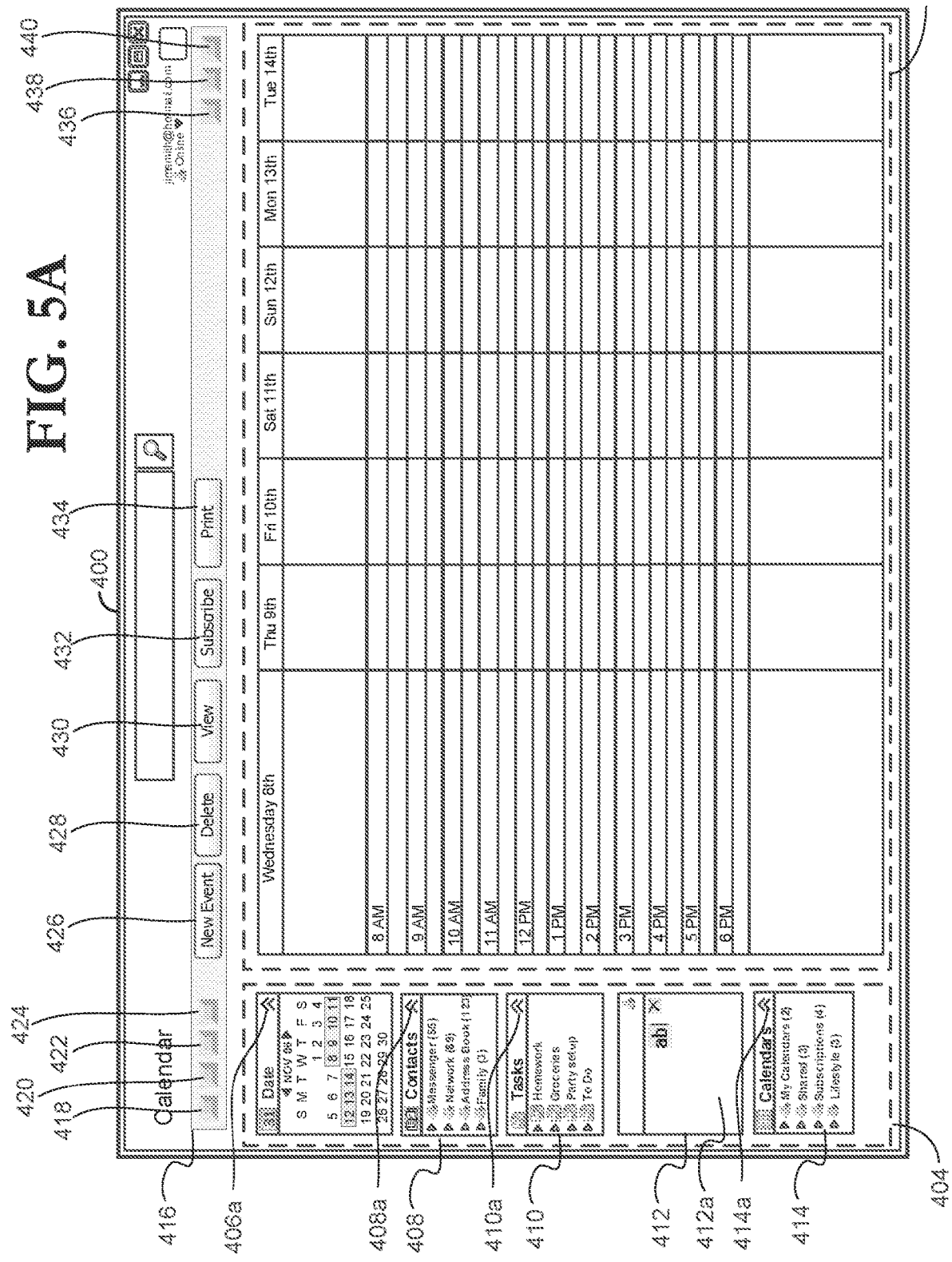
FIG. 5A illustrates an embodiment of a graphical user interface for a calendar application.

In step 301, the user selects and runs the calendar application from his computing device, for example, by clicking on a calendar icon. In step 302, the calendar application responds by displaying a first level GUI on the user's computing device that includes a suitable representation of a calendar and adequate graphical elements or "widgets" adapted for user interaction. For example, the GUI and its widgets may be rendered using a markup language, such as XML, and one example of a GUI is illustrated in FIG. 5A. One of the widgets provided on the calendar GUI is a button or other graphical element that when activated enables a routine for defining a new event for the calendar. Thus, when the user selects the new event button in step 303, the new event routine runs and displays a second level GUI for the new event on the user's computing device in step 304, for example, as a smaller pop-up window inside the larger calendar window. The second level or "new event" GUI includes additional widgets adapted for user interaction regarding event details, such as text fields for entering subject and location, and pull-down menus for selecting start date, start time, etc. All types of data input models could be incorporated as user interactive fields to record any number of relevant details of the event according to well known programming techniques, including user defined fields. These event detail widgets may be pre-programmed, or may be configurable by the user via an option setting in the calendar application, for example.

In step 305, the user selects at least one of the event detail widgets, and in step 306, the user creates data for the event via the widget, for example, by entering text in a text field, by clicking on a choice in a pull-down menu, or by other well known forms of data entry including a user defined field. Once sufficient details regarding the event have been created, the event and its details are saved as a multimedia object in step 307. Further, when saving the event as a multimedia object, an icon is created and associated with the object in step 308. Advantageously, the icon may also be a multimedia object, such as a still image, or may link additional multimedia content, such as audio, video, animation, interactive gadgets, etc.

In step 309, the multimedia object is placed onto a calendar location. If no time frame has been entered, the object is located at the present date and time. Thus, rather than simple text, a multimedia object represented by an icon is placed on the user's calendar to signify an event. The user may click on the icon to open the event and observe any details, or the user may send the icon to others over a network and thereby share the event including any event details stored with the event. For example, if the event is a birthday party, the icon may be an image of a gift-wrapped birthday present, and the image associated with the multimedia object will be visible on the calendar at the desired date/time. The term "event" is used broadly and is intended to be all-inclusive of any type of activity.

Multimedia content may be provided in many different formats, which are most easily recognized by the file extension. Table I below lists many of the common multimedia formats:

TABLE I

COMMON MULTIMEDIA FORMATS

| Type | File Extension | Description |
|---|---|---|
| Audio: | .mid or .midi | Musical instrument Digital Interface ("MIDI") |
| | .rm or .ram | RealAudio ® format |
| | .au | Audio Format |
| | .aiff | Audio Interchange File Format |
| | .snd | Sound Format |
| | .wav | Waveform |
| | .mp3 or .mpga | Popular for music recording |
| | .wma | Windows ® Media Audio |
| Video: | .avi | Audio Video Interchange |
| | .wmv | Windows ® Media Format |
| | .mpg or .mpeg | Moving Pictures Expert Group |
| | .mov | QuickTime ® format |
| | .rm or .ram | RealVideo ® |
| | .swf | Shockwave ® (Flash) format |
| Other: | .asf | Advanced Streaming Format (audio, video, slide shows, synchronized events) |
| | .asx | Advanced Stream Redirector (metafiles to provide information about files) |

Internet browsers may handle multimedia files in different ways. For example, some browsers come packaged with one or more support applications that function as a media player for playing multimedia content as an inline task, i.e., content is automatically played when encountered. Other browsers require a separate "plug-in" application that can be launched by the browser to play the multimedia content at the user's discretion. Advantageously, most plug-in applications allow some or all of the media player settings, such as play, pause, stop, rewind, and volume, to be controlled manually via a software control panel, or in a programmed mode. For example, as noted, inline media may be incorporated directly into a document or web page and is activated immediately upon opening the document or page. Inline sounds can be added to a page by using XML or HTML elements, such as <bgsound> or <img>, in relevant sections of code. Inline videos can be added to a page by using the <img> element. For example, the following snippet of code may be used to display a MIDI file named "sample1" as background music on a page when the page is selected:

<bgsound src="sample1.mid"/>

Plug-ins can be launched using the <embed> element, the <applet> element, or the <object> element in relevant sections of code. For example, the following snippet of code embeds the AVI file named "sample2" into a web page:

<object data="sample2.avi" type="video/avi"/>

A web page may also include a hyperlink to a media file, and most browsers utilize a plug-in to play the linked file. If the user clicks on the link, the browser launches the appropriate plug-in, such as Windows® Media Player, and the media content will be played under user control. Further, a web page may include an interactive gadget, which is a JavaScript application written for a gadget host, such as www.live.com.

Thus, in one embodiment, an appropriate calendar GUI and new event GUI may be specified and rendered using XML code. Further, the <object> element may be used in relevant portions of the XML code to define and embed different media types, such as pictures, web pages, sounds, videos, calendars, graphics, flash animations, etc., into a web page or document, such as the calendar GUI. The attributes of the <object> element can be defined by the user/programmer using well known techniques. For example, a programming reference for the <object> element is presented in Table II.

TABLE II

Programming Reference for <Object> Element

| Attribute | Defines |
|---|---|
| *OBJECT REFERENCE* | |
| classid | A unique id for the object. |
| height | The height of the object in pixels or %. |
| width | The width of the object in pixels or in %. |
| *PARAMETER REFERENCE* | |
| src | The source of a RealAudio or RealVideo clip. |
| control | The visibility of the controls. |
| console | A console name to link multiple controls. |
| autostart | Automatic start. (true/false). |
| nolabels | Suppression of label texts in the controls window. |
| reset | Resetting the control for playlist. (true/false). |
| autogotoURL | How a URL is handled (true/false). True forwards URL event to the browser. False uses VBScript event instead. |
| *CONTROL VALUES* | |
| Value | Display |
| All | Displays a full player with all controls. |
| InfoVolumePanel | Title, author, and copyright and volume slider. |
| InfoPanel | Title, author, and copyright. |
| ControlPanel | Position slider, play, pause, and stop buttons. |
| StatusPanel | Messages, current time position, and clip length. |
| PlayButton | Play and pause buttons. |
| StopButton | Stop button. |
| VolumeSlider | Volume slider. |
| PositionField | Position and clip length. |
| StatusField | Messages. |
| ImageWindow | The video image |
| StatusBar | Status, position and channels. |

Figure 3B:
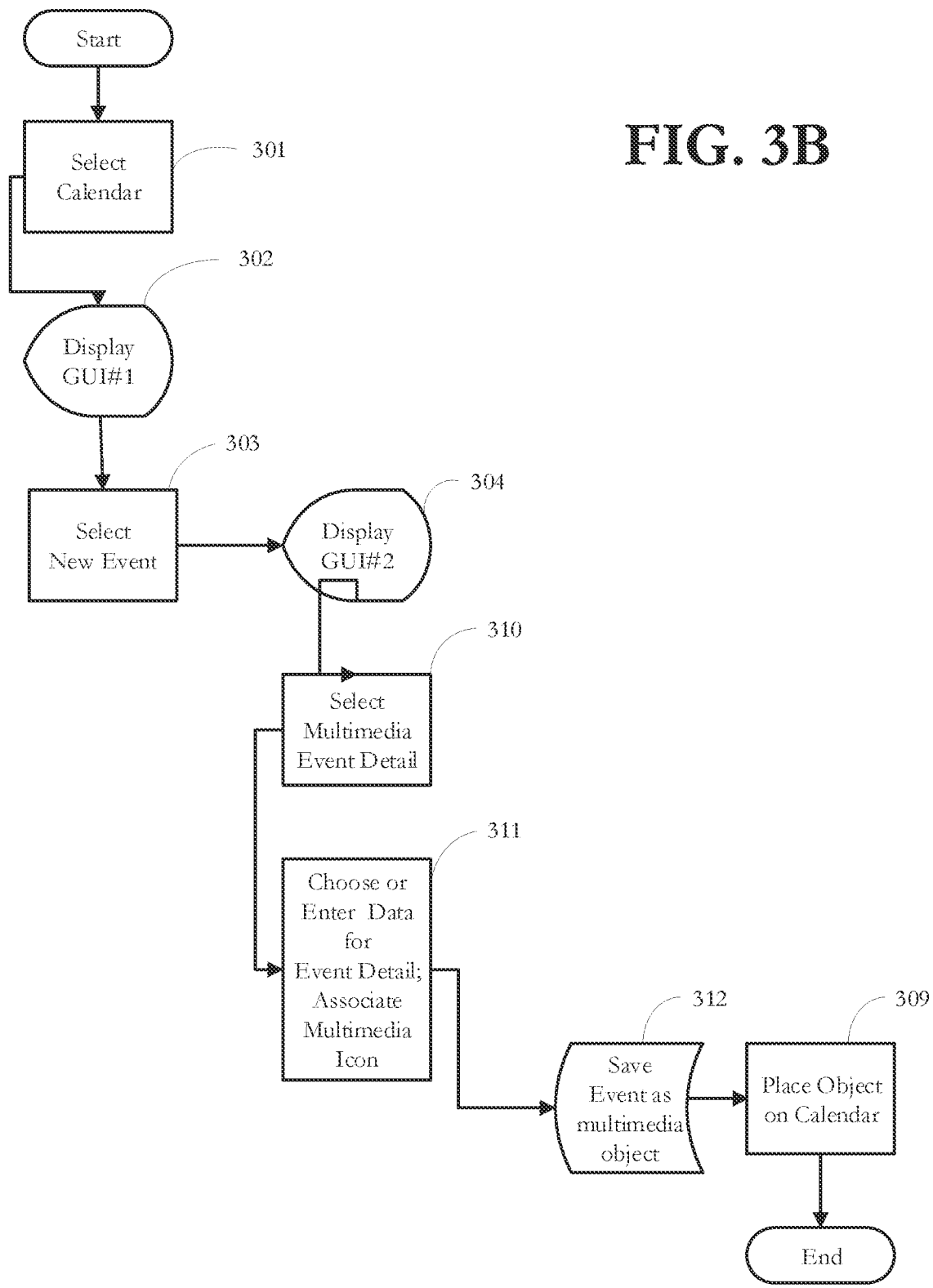

FIG. 3B illustrates a process similar to that of FIG. 3A, in which steps 301-304 are the same. In step 310, however, instead of selecting any event detail widget as in FIG. 3A, the user selects a specialized event detail widget that has been configured to incorporate multimedia content. For example, the widget may utilize a pull down menu that is pre-populated with choices including one or more choices that include an icon or a link to multimedia content. In addition, a user-configurable field could be incorporated to allow the user to enter customized text and/or images and/or links to multimedia content. Then in step 311, the user creates data for the event via the widget, for example, by clicking on a choice in the pull-down menu, or by entering customized data in the user-defined field, which may include text and/or images and/or links to multimedia content. In one embodiment, any multimedia content, whether pre-programmed or user-defined, is represented by an icon, which may be automatically associated with the choice when selected by the user. In step 312, the event is saved as a multimedia object, and in step 309, the object is placed onto the calendar.

Figure 3C:
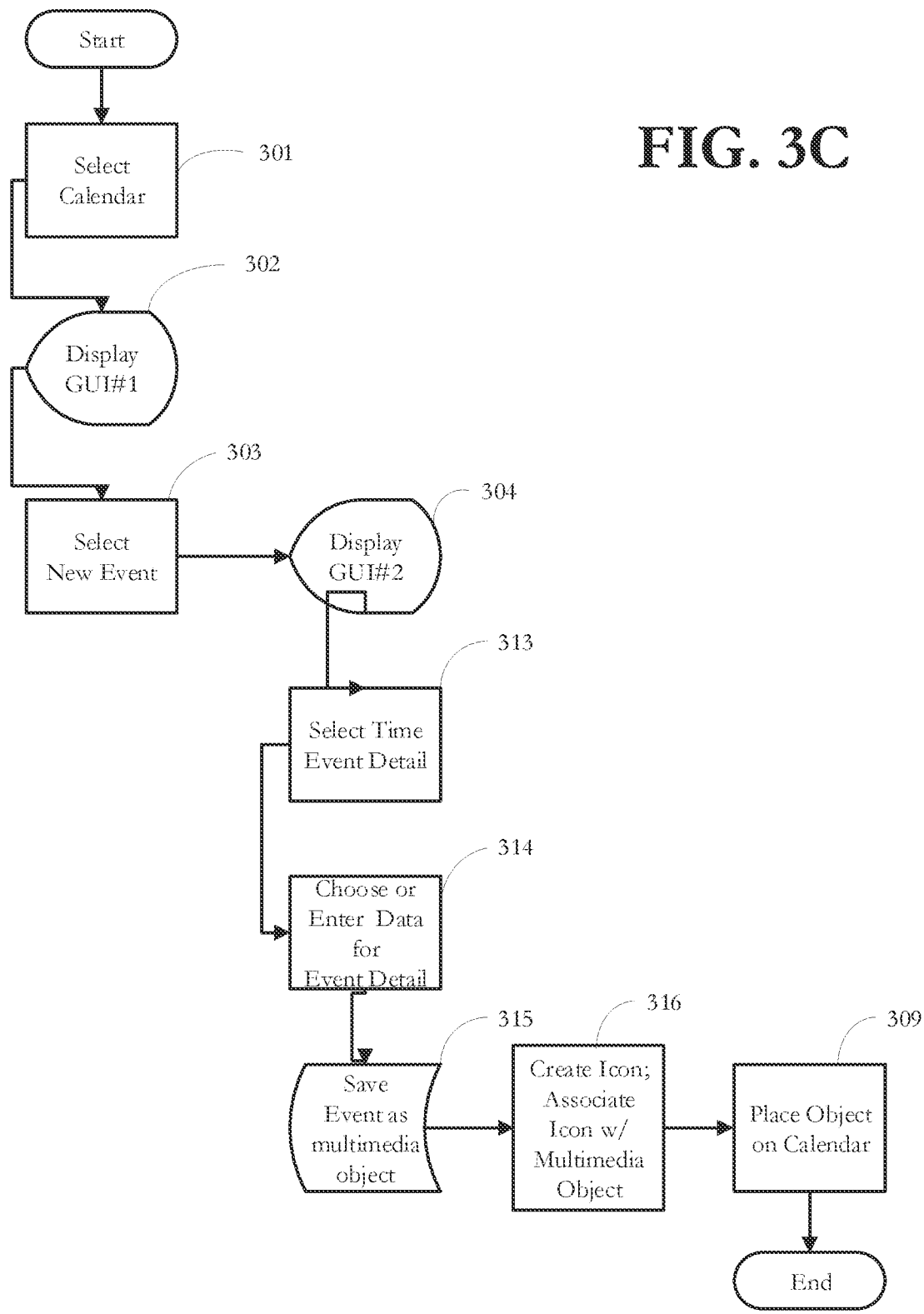

FIG. 3C illustrates a process similar to that of FIGS. 3A and 3B, in which steps 301-304 are the same. In step 313, however, the user selects a specialized event detail widget that has been configured to provide greater variety in associating time frames with an event, including approximate or indefinite times, as well as specific times. For example, the specialized widget may be a series of pull down menus that provide choices for specific times or indefinite times. In step 314, the user creates data for the event via the widget, namely a time frame, for example, by clicking on a choice in the pull-down menu. In step 315, the event and corresponding time related data entered by the user is saved as a multimedia object. In step 316, an icon is created and associated with the multimedia object when the event is saved, and in step 309, the object is placed onto the calendar.

Figure 4:
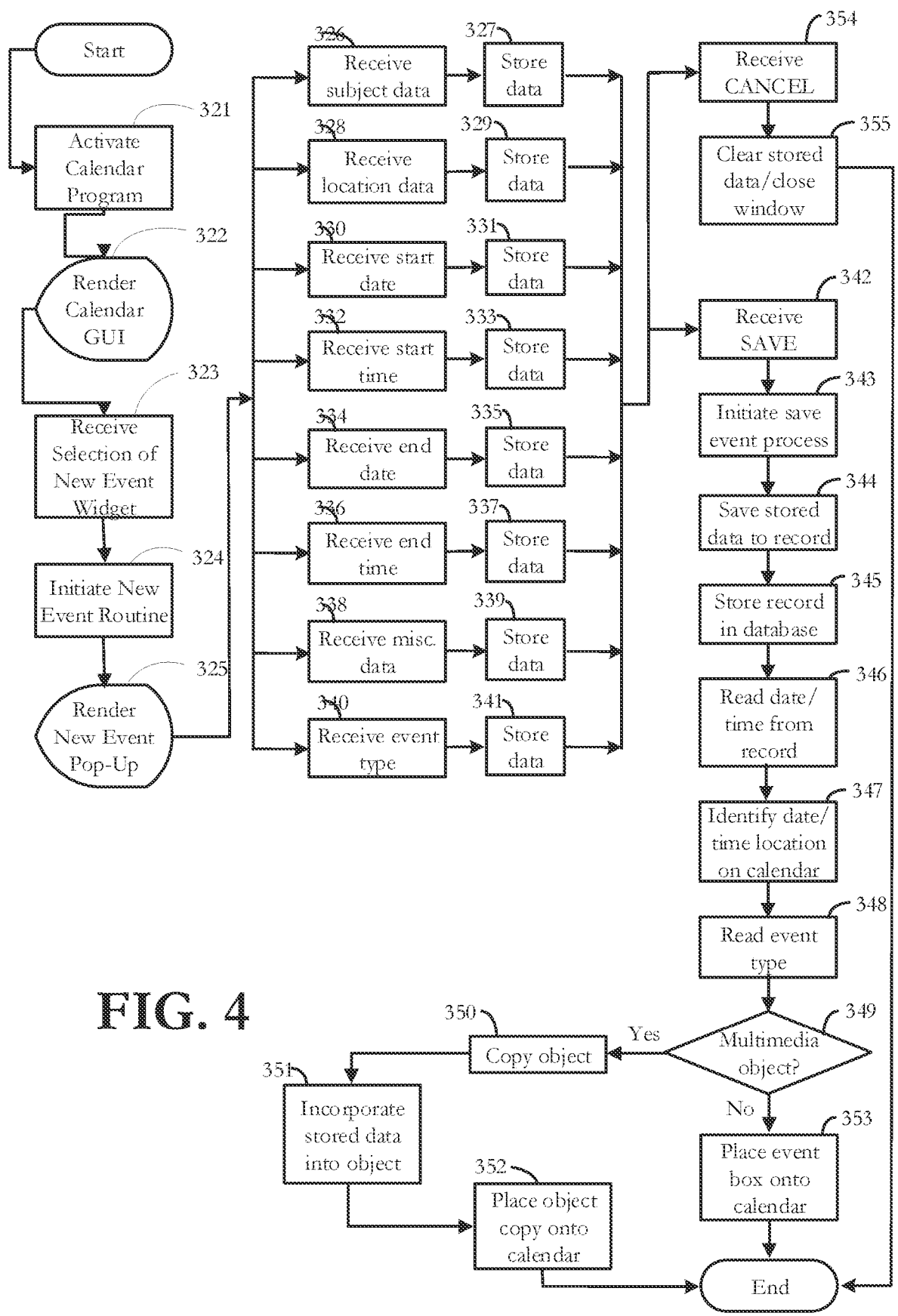
FIG. 4 is a flowchart illustrating an embodiment of a software process for defining a new event.

FIG. 4 illustrates one embodiment of a detailed software process for defining a new event, for example, in correspondence with the user experience illustrated in FIG. 3B, and FIGS. 5A-5E illustrate a series of screen shots that correspond to this software process. Referring to FIG. 4, in step 321, the calendar program is activated upon selection by the user. In step 322, the program renders a calendar GUI. As previously noted, the GUI may be rendered using a markup language to include a suitable calendar representation and widgets for user interaction, for example, as shown in FIG. 5A. The creation and rendering of the GUI are conventional and not described in detail herein. Thus, the following description is focused on the routine for defining a new event on the calendar, and descriptions of other functional widgets shown in FIG. 5A are not included.

In step 323, the program receives a user selection of a "new event" widget on the GUI, such as the "New Event" button 426 shown on FIG. 5A. In step 324, in response to user selection of the New Event button, the program initiates a routine for defining the new event. In step 325, the routine displays a pop-up window, such as window 450 in FIG. 5A. The pop-up window includes various widgets that may be pre-programmed in a known manner to allow a user to enter specific details for the event.

Step 326-341 are organized as parallel paths that may be performed at any time while the new event routine is running, i.e., as long as the new event pop-up window is displayed. In step 326, the routine receives data entered by the user in the subject field, and in step 327, the data is stored in a temporary buffer. In step 328, the routine receives data entered by the user in the location field, and in step 329, the data is stored in a temporary buffer. In step 330, the routine receives a selection by the user of a start date, for example, from a pull down menu, and in step 331, the start date is stored in a temporary buffer. In step 332, the routine receives a selection by the user of a start time, for example, from a pull down menu, and in step 333, the start time is stored in a temporary buffer. In step 334, the routine receives a selection by the user of an end date, for example, from a pull down menu, and in step 335, the end date is stored in a temporary buffer. In step 336, the routine receives a selection by the user of an end time, for example, from a pull down menu, and in step 337, the end time is stored in a temporary buffer. In step 338, the routine receives data entered by the user in a miscellaneous field, and in step 339, the data is stored in a temporary buffer. In step 340, the routine receives a selection by the user of an event type, for example, from a pull-down menu, and in step 341, the event type is stored in a temporary buffer. Advantageously, some event types may include a multimedia object. For example, as shown in FIG. 5C, a still image may be incorporated onto the pull-down menu along with descriptive text and associated with a specific event type.

Figure 5B:
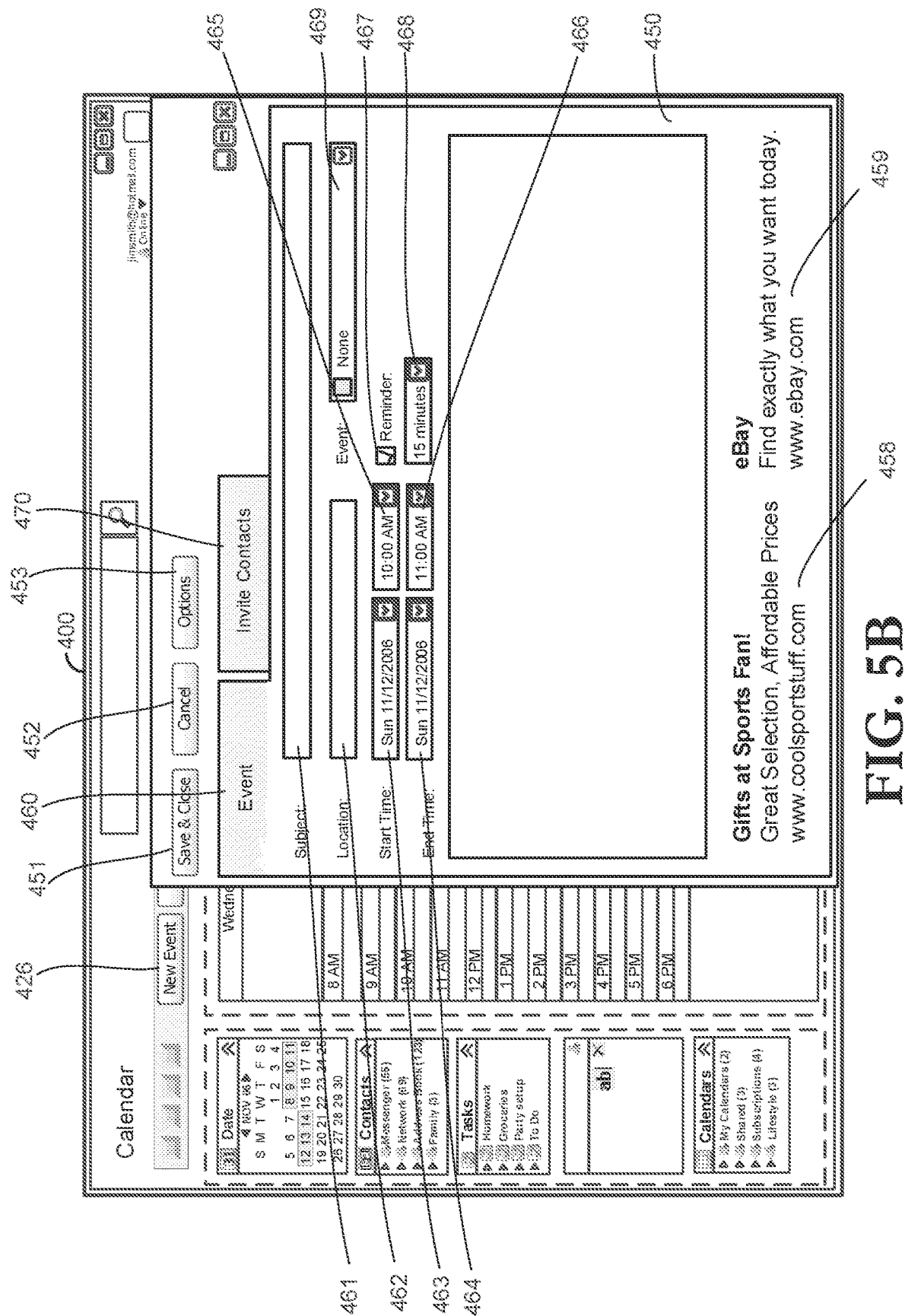
FIG. 5B-5D illustrate a series of steps taken in a pop-up window that appears over the graphical user interface of FIG. 5A when the user chooses to create a new event.
Figure 5C:
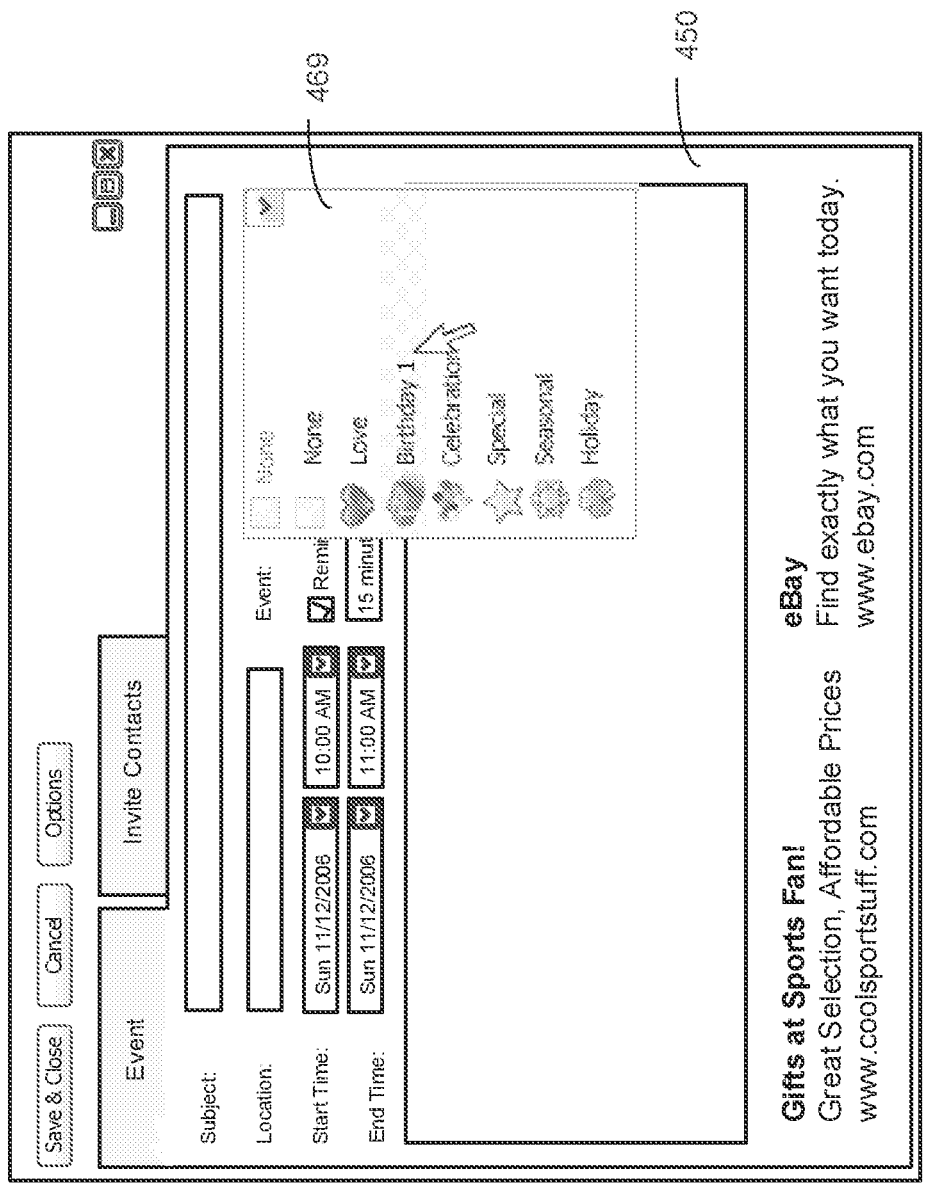

In step 342, the routine receives the selection by the user of a widget to save the event and all its details, such as the SAVE button 451 shown on FIG. 5B. In response to the selection of the SAVE button, the routine then initiates a process to save the event and to incorporate the event onto the calendar GUI in step 343.

In step 344, the process first saves all the data stored in temporary buffers in steps 326-341 by storing the data in a record created for the event. For example, the record may have all the same fields as the new event pop-up window, and a unique record is created for each event. In step 345, the record is stored in a database that is associated with the calendar GUI.

In step 346, the process reads the date and time fields in the stored record, and in step 347, the process uses the data in those fields to identify a specific calendar location on the calendar GUI. In step 348, the process reads the event type field in the stored record. If this field includes a multimedia object in step 349, then a copy of the object is made in step 350. In step 351, the data in the stored record is incorporated into the multimedia object copy. In step 352, the multimedia object copy is placed onto the calendar GUI at the calendar location specified in step 347. For example, the event representation in FIG. 5E shows an image of a wrapped present incorporated onto the calendar GUI at a specific time. If the event type field does not include a multimedia object in step 349, then a more conventional event representation may be placed onto the calendar in step 353, for example, a rectangular box that is bounded by the date and time data read from the stored record.

In step 354, the routine receives the selection by the user of a widget to cancel the creation of the event, such as the CANCEL button 452 shown on FIG. 5B. In response to the selection of the CANCEL button, the routine clears all data from the temporary storage buffers and closes the pop-up window in step 355.

Referring now to FIG. 5A, in one embodiment, a GUI 400 is rendered using a markup language, such as XML, and is configured with adequate widgets, such as windows, buttons, and menus, to provide suitable functionality to the GUI, although the described embodiments are intended to be illustrative only and not limiting. The GUI 400 is divided into a number of distinct windows or panels each having separate functionality. Thus, a large window area 402 ("the calendar window") is provided to display a representation of a calendar. A typical default setting for the calendar view, illustrated in FIG. 5A, shows a series of seven consecutive days beginning with the current day, with each day being divided into rectangular time blocks, although different calendar views can be pre-programmed and selectable via a widget, or user configurable using well known techniques.

A smaller window area 404 ("the sidebar window") is adjacent to the calendar window 402 and may be configured to incorporate functional modules that preferably have relevance to use of the calendar application for scheduling events. Of course, the size and location of calendar window 402 and sidebar window 404 are completely arbitrary and may be predefined differently than the illustrated embodiment, or changed in a well known manner, for example, by clicking and dragging the edge of the window area or the modules themselves. The illustrated functional modules in the sidebar window 404 include calendar module 406, contacts module 408, tasks module 410, chat module 412, and shared calendar module 414, although the choice of modules is arbitrary and may be changed by the user using tools or options in the calendar application. For example, in the selected view, calendar module 406 displays the current month, but the display may change if a different calendar view (such as day or week) is selected. The top of each module is a mini-task bar that includes the title of the module and its related icon, as well as a show/hide button that is configured to either show or hide the contents of the module when the button is selected. For example, the top bar of calendar module 406 includes show/hide button 406a, and in FIG. 5A, the contents of module 406 are showing, and this is indicated on the button by down arrows (e.g. the contents are pulled down and exposed). The contents of the module 406 could be hidden by clicking on button 406a, and the arrows would change direction to show up arrows (e.g. the contents are pulled up and hidden).

Contacts module 408 may include one or more links to sources of contact information, which may be stored locally or remotely, e.g., on a network. For example, as illustrated in FIG. 5A, the user may have contact information stored in four different places: an instant messaging application called "Messenger;" a contacts manager for other users in the network called "Network;" a local application called "Address Book;" and/or a user defined list called "Family." The top bar of the contacts module 408 includes the title and title icon for the module, as well as show/hide button 408a.

Tasks module 410 may be linked to one or more stored task lists. The top bar of the tasks module 410 includes the title and title icon, and show/hide button 410a. Chat module 412 may be linked to an instant messaging service, for example, and a text area 412a is provided for text entry and for displaying received messages. Shared calendar module 414 allows the user to keep and view multiple calendars, including shared calendars. The top bar of the calendar module includes the title and title icon, and show/hide button 414a.

A task bar 416 is provided above windows 402 and 404 to provide another functional window in GUI 400 housing additional widgets, such as buttons 418-440, although the number and type of widgets could be varied according to need or preference. Each of the buttons 418-440 may initiate an operation directly or link to functional content. For example, buttons 418, 420, 422, and 424 are illustrated as generally organized above sidebar 404. Advantageously, one or more of these buttons could be linked to functional content related to a module in the sidebar. For example, in one embodiment, button 418 may be provided with a suitable icon and configured to call or activate an email program or some other desirable utility. Pressing button 418 calls the email program, which may open in a new window (not shown) to initiate a new email composition or to simply enter the user's mailbox. In one embodiment, button 420 may be provided with a suitable icon and configured to open the user's address book when pressed. Button 422 may be provided with a suitable icon and configured to initiate a routine to select and subscribe to RSS feeds. Button 424 may be provided with a suitable icon and configured to select different calendar settings. There may be more or fewer buttons or other widgets incorporated by preprogramming or user-definition according to need or preference.

In the illustrated embodiment, buttons 436, 438, and 440 are located to the far right of task bar 416, and may also be provided with suitable icons and configured to call relevant functions or link to functional content. For example, button 436 may be labeled with a printer icon and configured to initiate a print utility when selected; button 438 may be labeled with a an ink pen icon and configured to initiate an editing utility when selected; and button 440 may be labeled with a question mark icon and configured to initiate a help routine when selected.

Buttons 426-434 are organized in the task bar 416 above the calendar window. Button 426 is labeled "New Event" and when selected, a routine is run to define events as described below. Button 428 is labeled "Delete" and when selected deletes a selected event. Button 430 is labeled "View" and may be configured to provide selectable alternative calendar views. Button 432 is labeled "Subscribe" and can be configured to provide links to services requiring registrations, such as RSS information feeds. Button 434 is labeled "Print" and may be configured to run the local print utility.

Selecting the New Event Button 426 initiates a software routine to define an event, which starts with a new window 450 ("the new event window") that pops up on GUI 400, as shown in FIG. 5B. The new event window 450 is constructed using well-known techniques, such as XML programming, as described above. For example, new event window 450 includes a first tab 460 and a second tab 470. In addition, button 451 is configured to save the event details; button 452 is configured to cancel any details or changes entered into the event window 450 but not yet saved; and button 453 is configured to provide additional widgets for setting user options.

The first tab 460 is labeled "Event" and includes sufficient widgets to define the event, for example, a text box 461 for entering the subject of the event, a text box 462 for entering the location of the event, a pull down menu 463 for selecting the start date, a pull down menu 464 for selecting the end date, a pull down menu 465 for selecting the start time, a pull down menu 466 for selecting the end time, a check box 467 that when checked enables a reminder, and a pull down menu 468 for selecting the reminder time. These widgets are commonly found in conventional calendar applications, such as Windows Live™ Calendar or Microsoft® Outlook®. The second tab 470 can be defined with sufficient widgets to identify and invite attendees to the event, however, this functionality is well known and therefore not described in detail herein, and may include selecting attendees from one of the user's contact lists or entering a list of attendees.

Another functional widget incorporated into new event window 450 in this embodiment is pull down menu 469, which is configured to allow the "type" of event to be defined or selected. A variety of event types can be predefined or user defined on the pull down menu for selection by the user and saved as a detail of the event. Advantageously, the event type menu 469 can be configured to allow multimedia content to be associated with the event definition. For example, FIG. 5C shows event type menu 469 in its pulled down state such that all choices for event type are listed and visible, including predefined choices such as "Love," "Birthday 1," "Celebration," "Special," "Seasonal," and "Holiday," and each of these choices has an icon associated with it that is a simple image, such as a JPG file. For example, the event type "Birthday 1" is highlighted to show that the user has paused on that choice. Further, the event type "Birthday 1" includes an icon 469*a* that is an image of a wrapped birthday present. However, the icon could be any type of multimedia object and linked or embedded as described above.

Figure 5D:
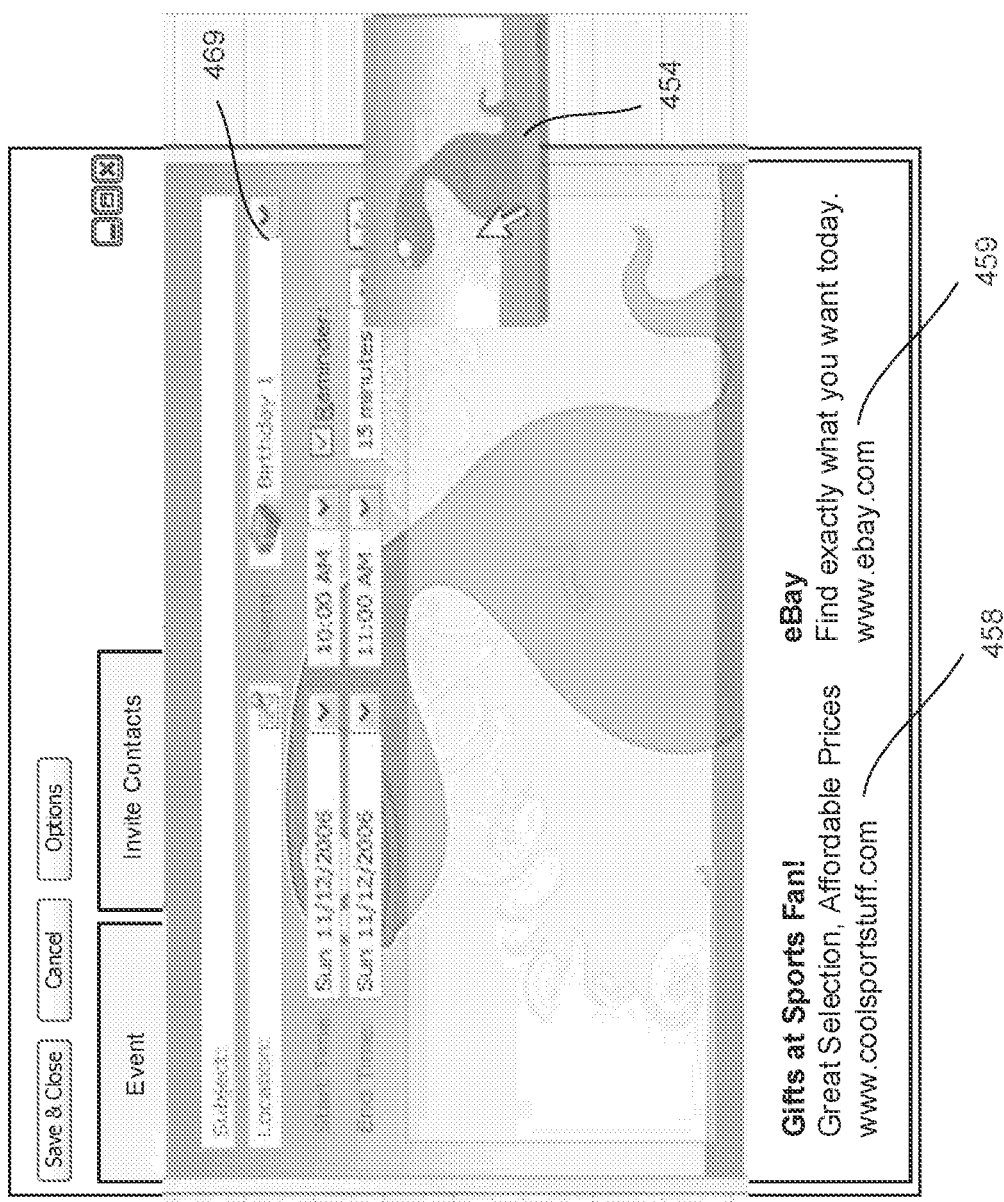
Figure 5E:
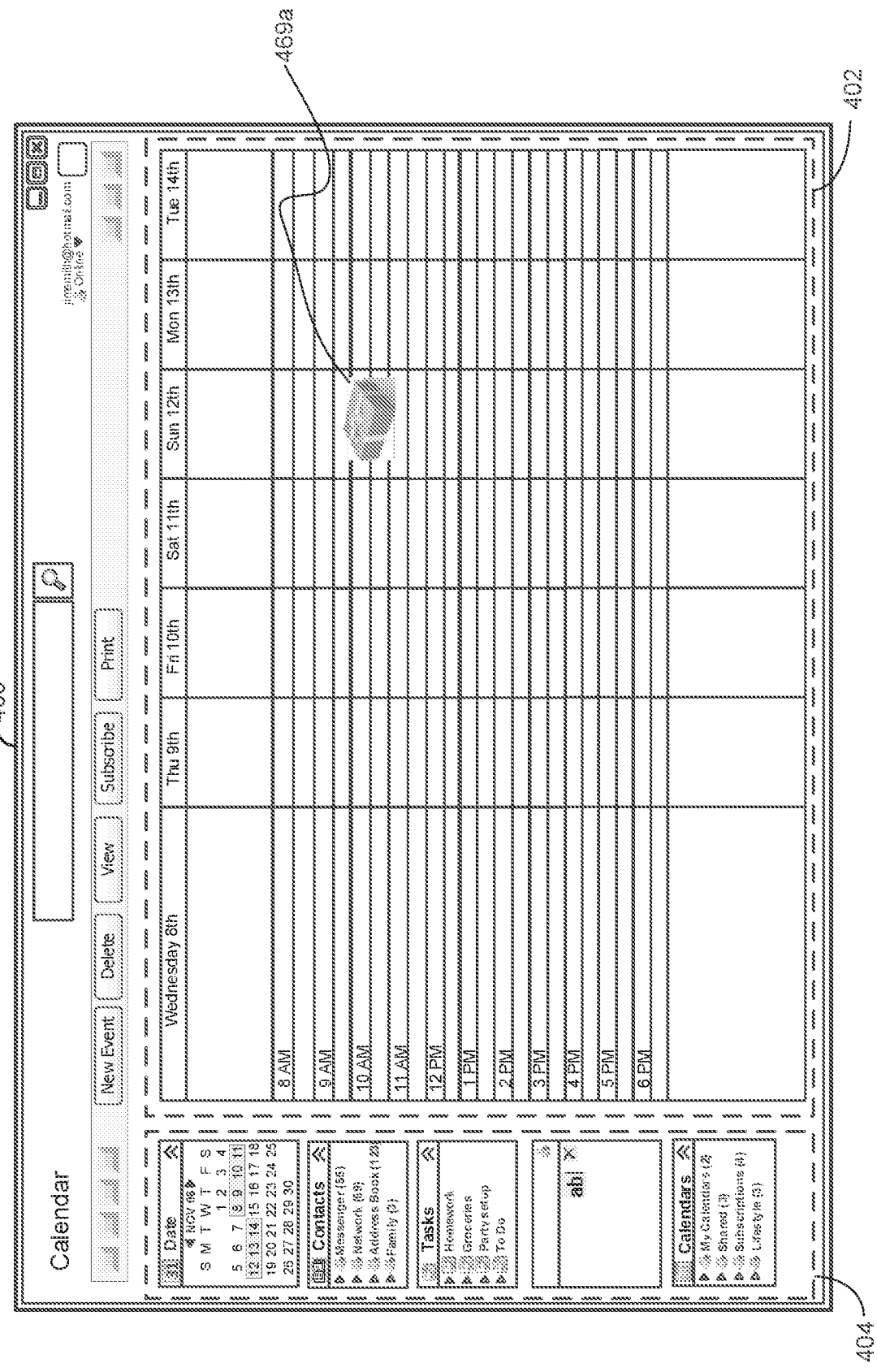
FIG. 5E illustrates the graphical user interface of FIG. 5A modified to show an icon placed on the calendar to represent an event.

In FIG. 5D, the user has accepted the selection of event type "Birthday 1" from pull down menu 469 and the list of other choices is again hidden. In addition, each event type listed on pull down menu 469 could link or incorporate additional multimedia content. For example, in this embodiment, a background image 454 of an animated dinosaur has been incorporated into the background of event window 450. This could be enabled in several ways, for example, by allowing the user to drag and drop an image onto the event window 450, as illustrated. Alternatively, the image could be linked with the event type and automatically saved as the background image for the event window simply by virtue of having chosen the event type. Also, FIG. 5D shows that other content could be linked to the event window 450, such as commercial advertisements linked to locations 458 and 459. For example, the content linked to locations 458 and 459 could be automatically generated based on a search using details of the event, such as event type, or could be user configured. Thus, for event type "Birthday 1," the search could provide links to sources of gifts. The multimedia content associated with an event type could come from a variety of other sources as well, such as user-customized links, RSS feeds, etc., and is typically linked by an object-oriented software routine, such as XML programming using the <object> element.

Once the event type has been defined and accepted by the user, the icon 469*a* and any multimedia content that has been linked or associated with the event type is saved as part of the event detail. Advantageously, the event may be saved as a multimedia object as described above. Further, icon 469*a* may be used as the file icon associated with the event, and can be placed onto the calendar to represent the event. For example, as shown in FIG. 5E, the wrapped birthday present icon 469*a* is placed onto the calendar representation in calendar window 402 between 10 a.m. and 11 a.m. on Sunday the 12$^{th}$ because those are the saved details of the event as shown in event detail window 450. Clicking on the icon on the calendar will open event window 450 to show all saved details of the event and will enable any other multimedia content linked with the event.

Figure 6:
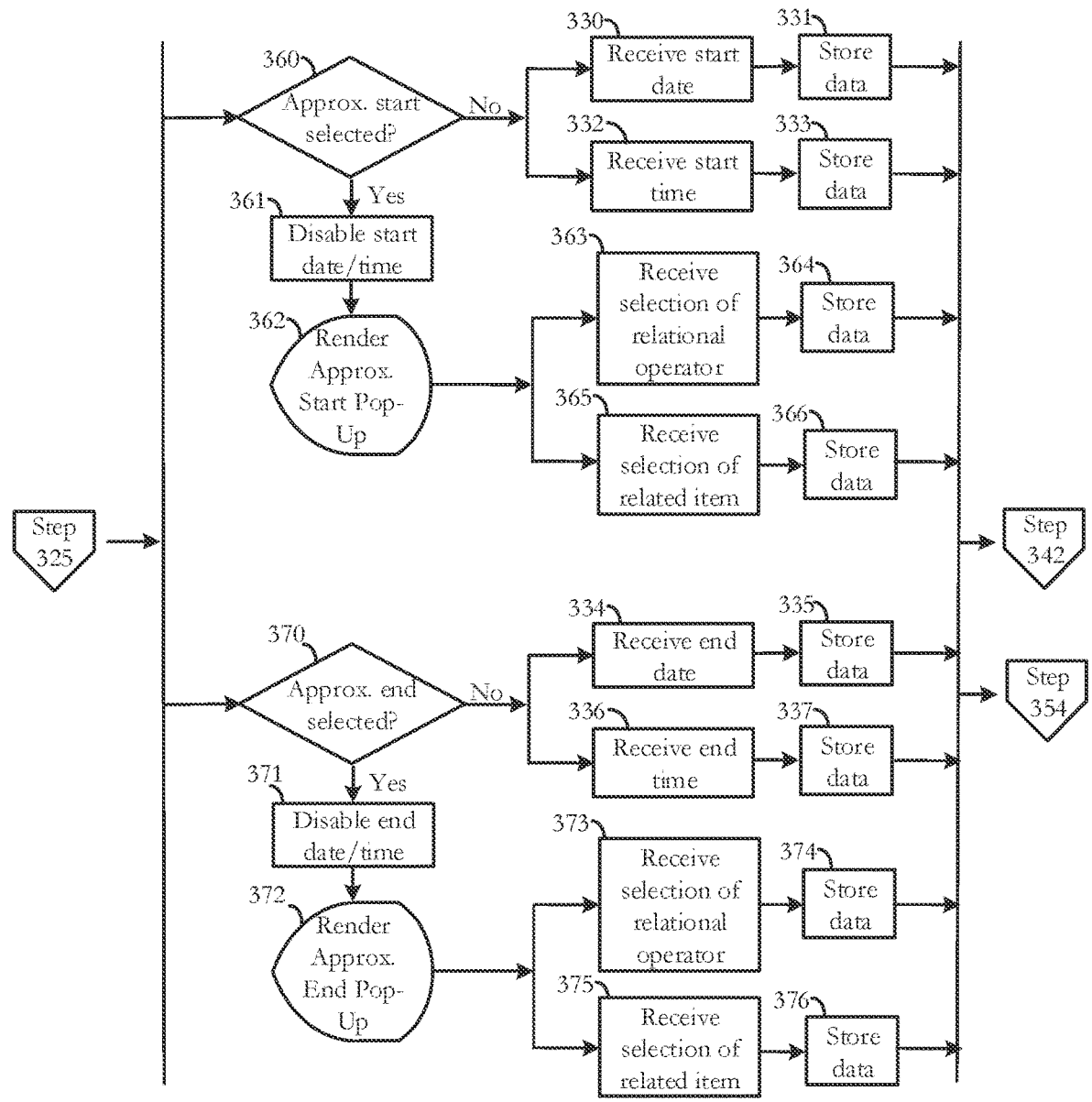
FIG. 6 is a flowchart illustrating an embodiment of a software process for defining a new event.

FIG. 6 illustrates a portion of another detailed software process for defining a new event. Steps 321-329 and steps 338-355 are the same as in FIG. 4 and are therefore not shown in detail but just schematically. However, in FIG. 6, steps 330-337 have been augmented with additional steps for defining an approximate time frame for the event. Further, the new event pop-up window rendered in step 325 is modified to incorporate additional widgets for selecting an approximate time frame, rather than specific times, for example, as shown in FIG. 8A.

Figure 8A:
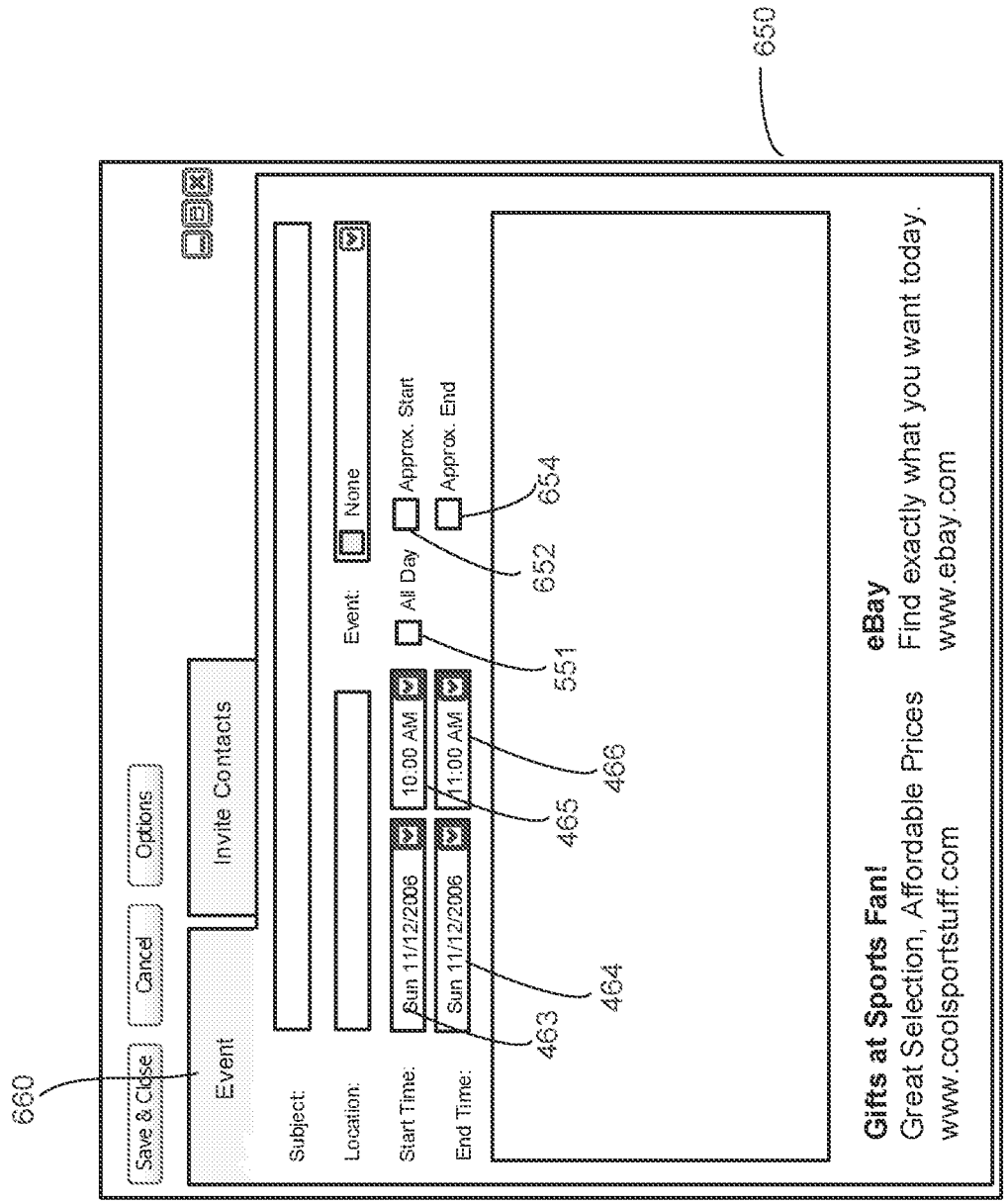
FIG. 8A illustrates an alternative embodiment of a pop-up window that appears over the graphical user interface of FIG. 5A when the user chooses to create a new event.

In step 360, if the user selects the widget for assigning an approximate start time to the event, then in step 361, the start date/time picker is disabled, and in step 362, a new pop-up window is rendered with suitable widgets for defining an approximate start time, for example, as illustrated in FIG. 8A. In step 363, the new event routine receives a selection of a relational operator, such as before, during, or after. In step 364, the selection is stored in a temporary buffer. In step 365, the routine receives a selection of an item to relate to, which may be an event, a specific time. In step 366, the selection is stored in a temporary buffer. If the user does not select the widget for assigning an approximate start time, then steps 330-333 are performed as previously described on FIG. 4.

Similarly, if the user selects the widget for assigning an approximate end time in step 370, then the end date/time picker is disabled in step 371, and a new pop-up window is rendered in step 372 with suitable widgets for defining an approximate end time, for example, as illustrated in FIG. 8A. In step 373, the new event routine receives a selection of a relational operator, and in step 374, the selection is stored in a temporary buffer. In step 375, the routine receives a selection of an item to relate to, and in step 376, the selection is stored in a temporary buffer. If the user does not select the widget for assigning an approximate end time, then steps 334-337 are performed as previously described on FIG. 4.

Figure 7A:
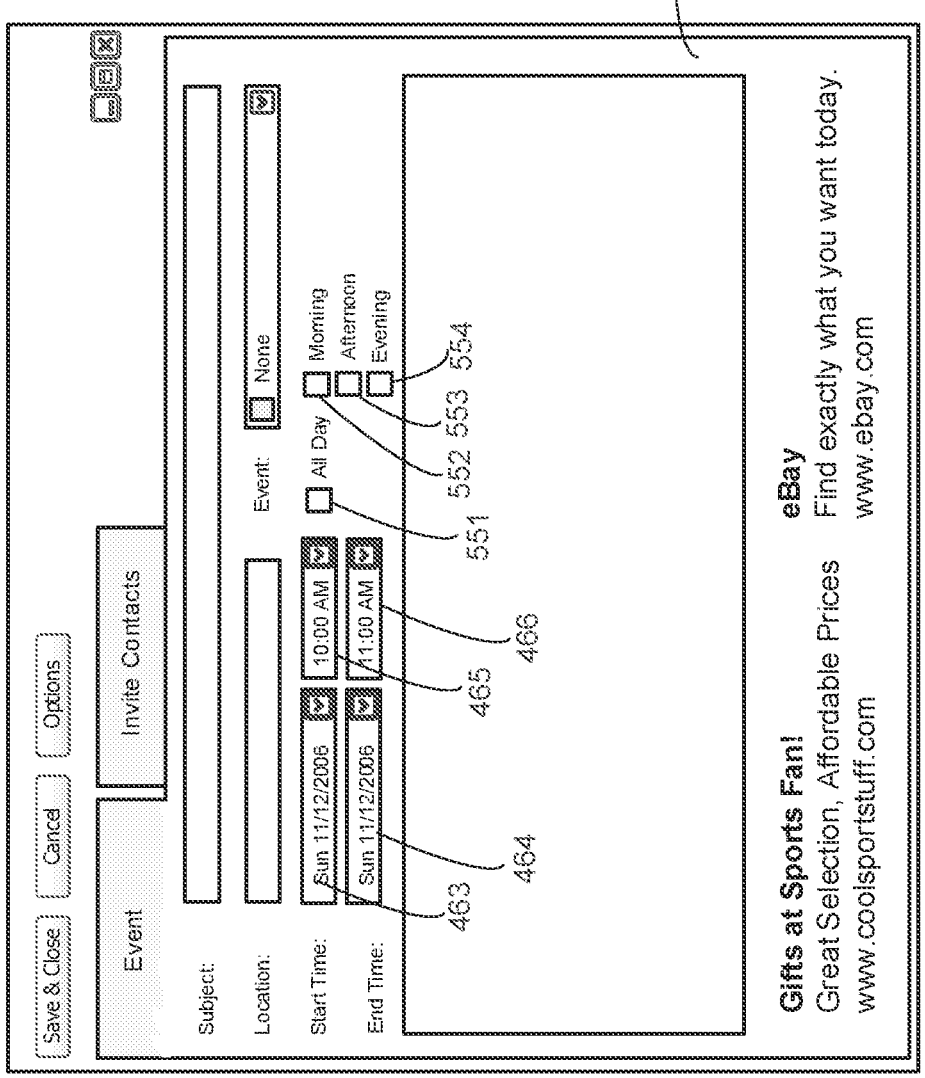
FIG. 7A illustrates an alternative embodiment of a pop-up window that appears over the graphical user interface of FIG. 5A when the user chooses to create a new event.
Figure 7B:
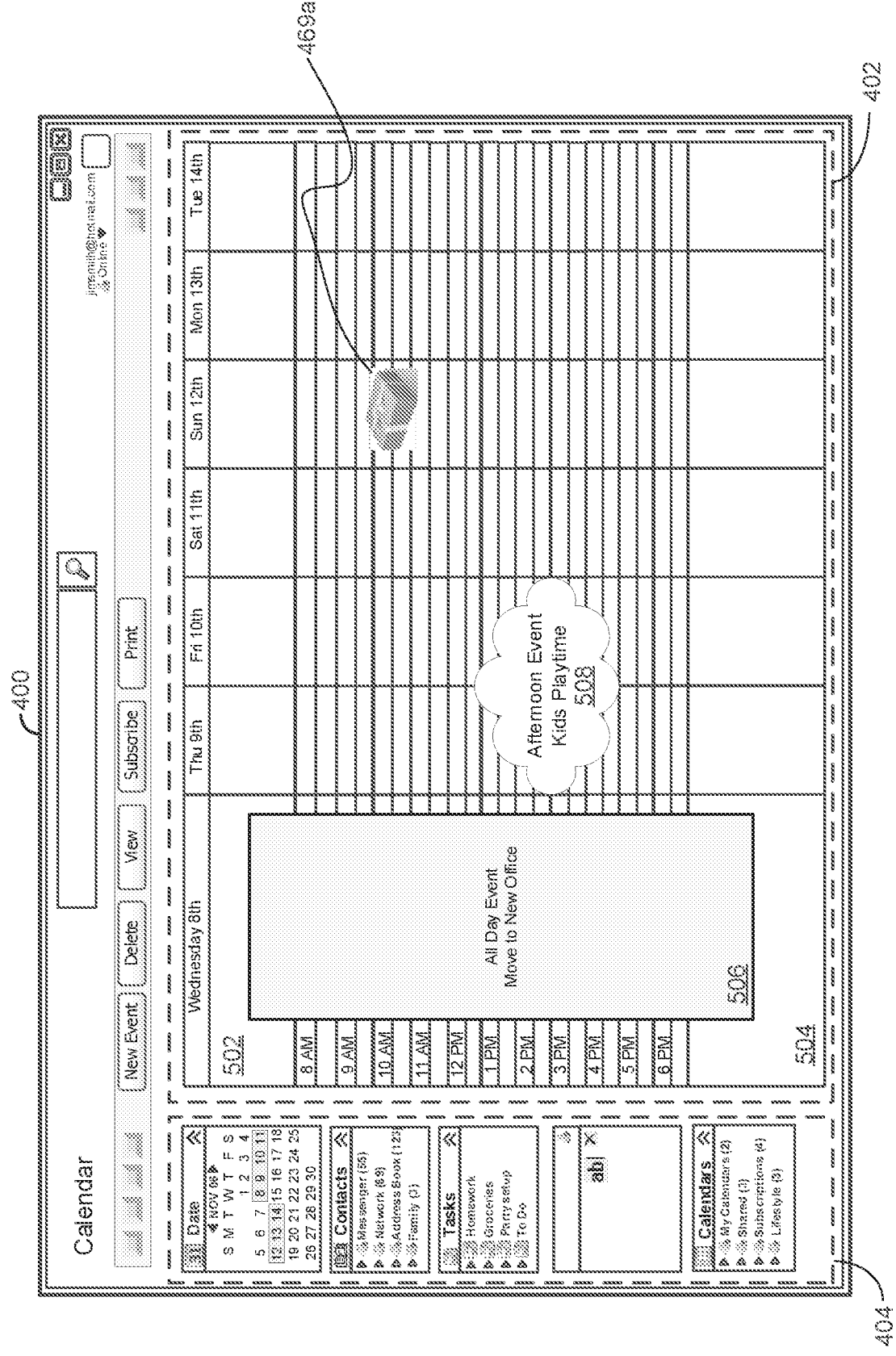
FIG. 7B illustrates one embodiment of a graphical user interface having events defined in a specific time frame and an approximate time frame.

FIG. 7A illustrates an embodiment of a new event window 550 that allows events to be defined with an approximate or less specific time frame. Thus, when new event button 426 is selected in GUI 400, new event window 550 pops up. New event window 550 may include all the widgets defined for window 450, but for this embodiment, check boxes 551, 552, 553, and 554 are also provided. If any one of the check boxes 551, 552, 553, and 554 is checked, then time and date fields 463, 464, 465, and 466 are disabled and shown in light gray to indicate that the fields may not be selected. For example, if check box 551, labeled as "All Day," is checked by the user, then the event is defined as an all day event. This may be shown on the calendar representation by having a rectangular box 506 extending over all the hours shown for that day, as shown in FIG. 7B, or in a variety of other ways. For example, one alternative method may use an open area on the calendar representation for that day to place an event box for an all day event, such as header area 502 and footer area 504, which are provided for each day.

Check box 552 is labeled "Morning," check box 553 is labeled "Afternoon," and check box 554 is labeled "Evening." If one or more of these boxes is checked, then the event has an approximate time frame definition. An event having an approximate time may be represented by a non-rectangular shape to differentiate the event from other events having a specific time frame. Thus, if an event such as "Kids' Playtime" is defined and saved as an afternoon event on Thursday and Friday, then a non-rectangular shape, such as cloud 508 in FIG. 5B, is placed on the calendar to cover the afternoons on both Thursday the 9$^{th}$ and Friday the 10$^{th}$.

There are many other conceivable ways that an event could be defined in a new event window with an approximate time frame, and the examples provided herein are intended to be illustrative and not limiting. For example, FIG. 8A shows an alternative new event window 650 that may include all the widgets defined for window 450 in FIG. 5B, but for this embodiment, check boxes 551, 652 and 654 are also provided. Check box 551 is labeled "All Day" and functions as previously described, and when checked, time and date fields 463, 464, 465, and 466 are disabled and shown in light gray to indicate that the fields may not be selected. Check box 652 is labeled "Approx. Start" and check box 654 is labeled "Approx. End."

Figure 8B:
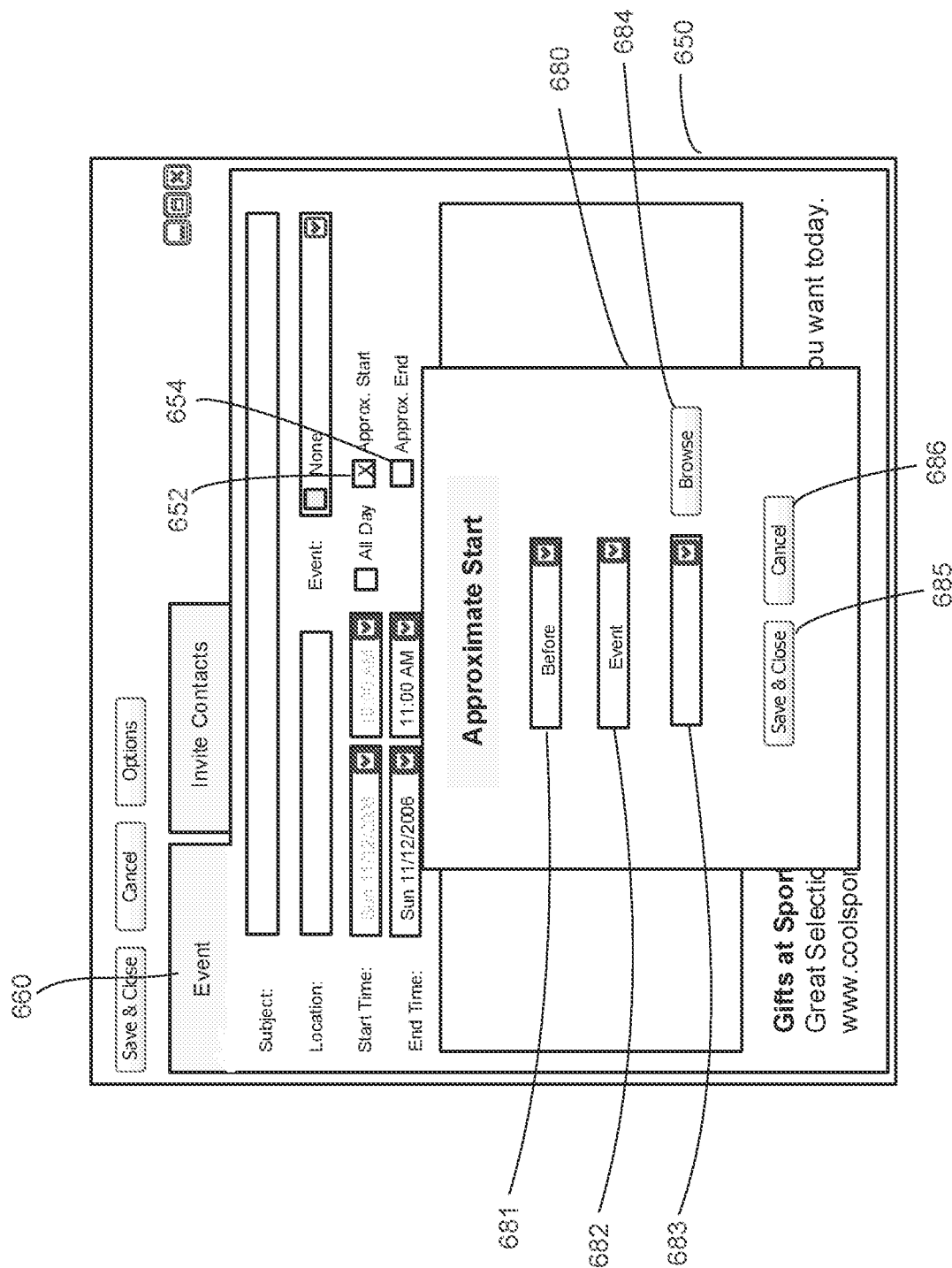
FIGS. 8B-8C illustrate additional embodiments of pop-up windows that allow the user to define events having approximate start times and end times, respectively.

If check box 652 is checked, the start time and date fields 463 and 465 are disabled and a new window 680 pops up over the new event window 650, as shown in FIG. 8B, that allows the user to define an approximate start time. Widgets in the new window 680 include pull down menu 681, pull down menu 682, data field 683, button 684 adjacent to the data field labeled "Browse," button 685 labeled "Save & Close," and button 686 labeled "Cancel." When the arrow on pull down menu 681 is selected, a list of choices for a relational operator is revealed, namely "Before," "During," and "After," and the user can select one of the choices. When the arrow on pull down menu 682 is selected, a list of choices is revealed for what to relate the time frame of the new event to, namely "Event" and "Time," and the user can select one of the choices. Thus, a user may define a new event as occurring before, during, or after another event or a specified time frame. For example, if "Event" is selected by the user from pull down menu 682, then data field 683 will be loaded with a stored list of previously defined events from the user's calendar. Alternatively, selecting browse button 684 will allow the user the search for and select from a list of events stored on other calendars. If "Time" is selected by the user from pull down menu 682, then data field 683 will be loaded with a calendar and a list of times, and the user may choose a date and time.

Figure 8C:
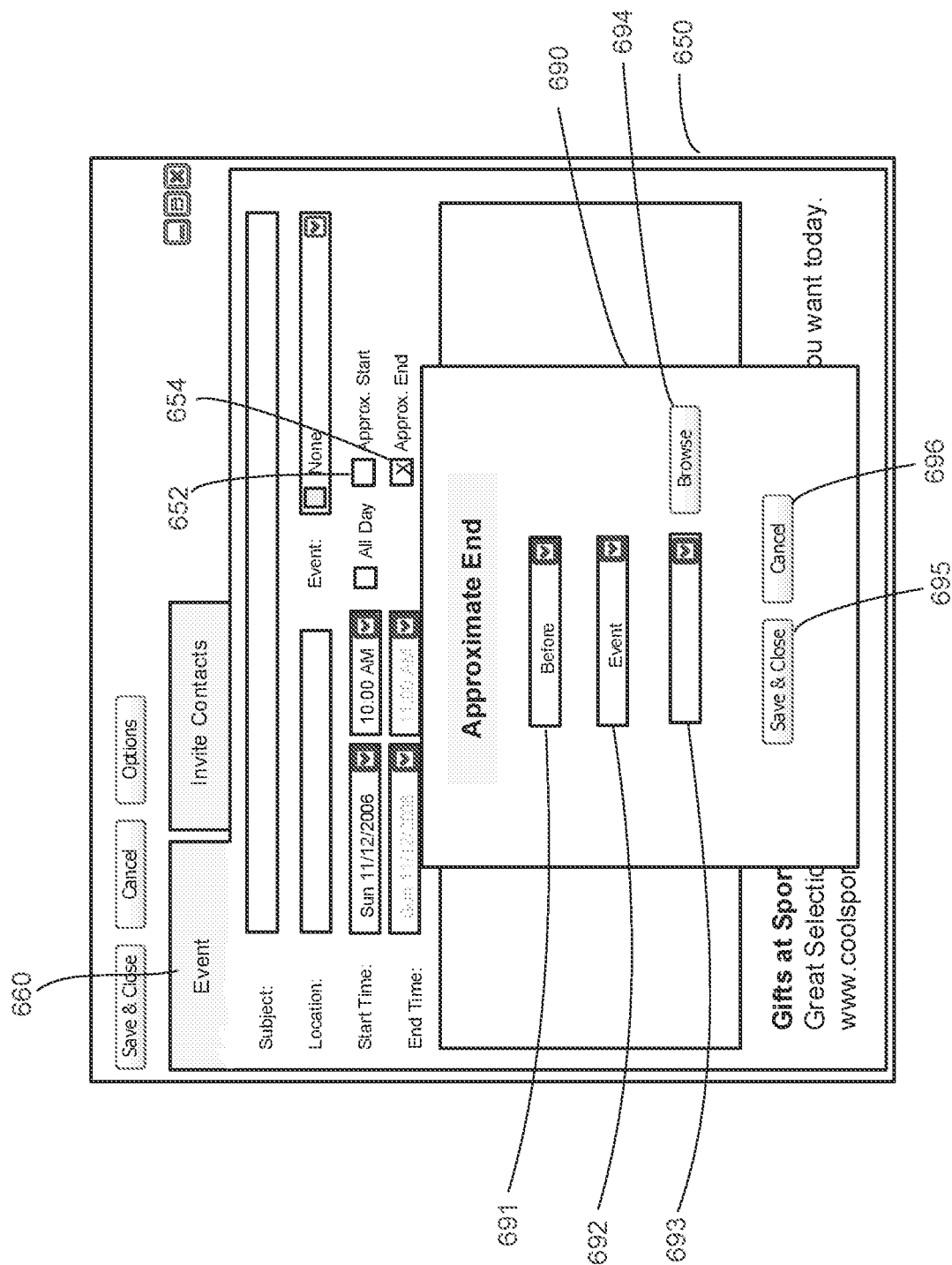

If check box 654 is checked, the end time and date fields 464 and 466 are disabled and a new window 690 pops up over the new event window 650, as shown in FIG. 8C, that allows the user to define an approximate end time. Window 690 is virtually the same as window 680 and includes pull down menu 691, pull down menu 692, data field 693, button 694 adjacent to the data field labeled "Browse," button 695 labeled "Save & Close," and button 696 labeled "Cancel." Pull down menus 691 and 692 list the same choices as menus 681 and 682, and all of the widgets operate in the same manner as described above.

Thus, the user may define a new event as having a relative or approximate time. For example, suppose the user is defining a new event called "Family Lunch" and it is planned for after "Dad's Birthday Party" (represented by icon 469a) but before "Travel to NY," two events that were previously created. Using window 650, box 652 is checked, and window 680 pops up. The user selects "After" from pull down menu 681, selects "Event" from pull down menu 682, then selects "Dad's Birthday Party" from the list of choices presented in field 683. Upon selecting the save button 685, the new event is created and saved to the calendar as an icon 512 with an approximate time frame. The user can then check box 654 and window 690 pops up. The user selects "Before" from pull down menu 691, selects "Event" from pull down menu 692, then selects "Travel to NY" from the list of choices presented in field 693. Upon selecting the save button 695, the event is updated and re-saved to the calendar.

Figure 9A:
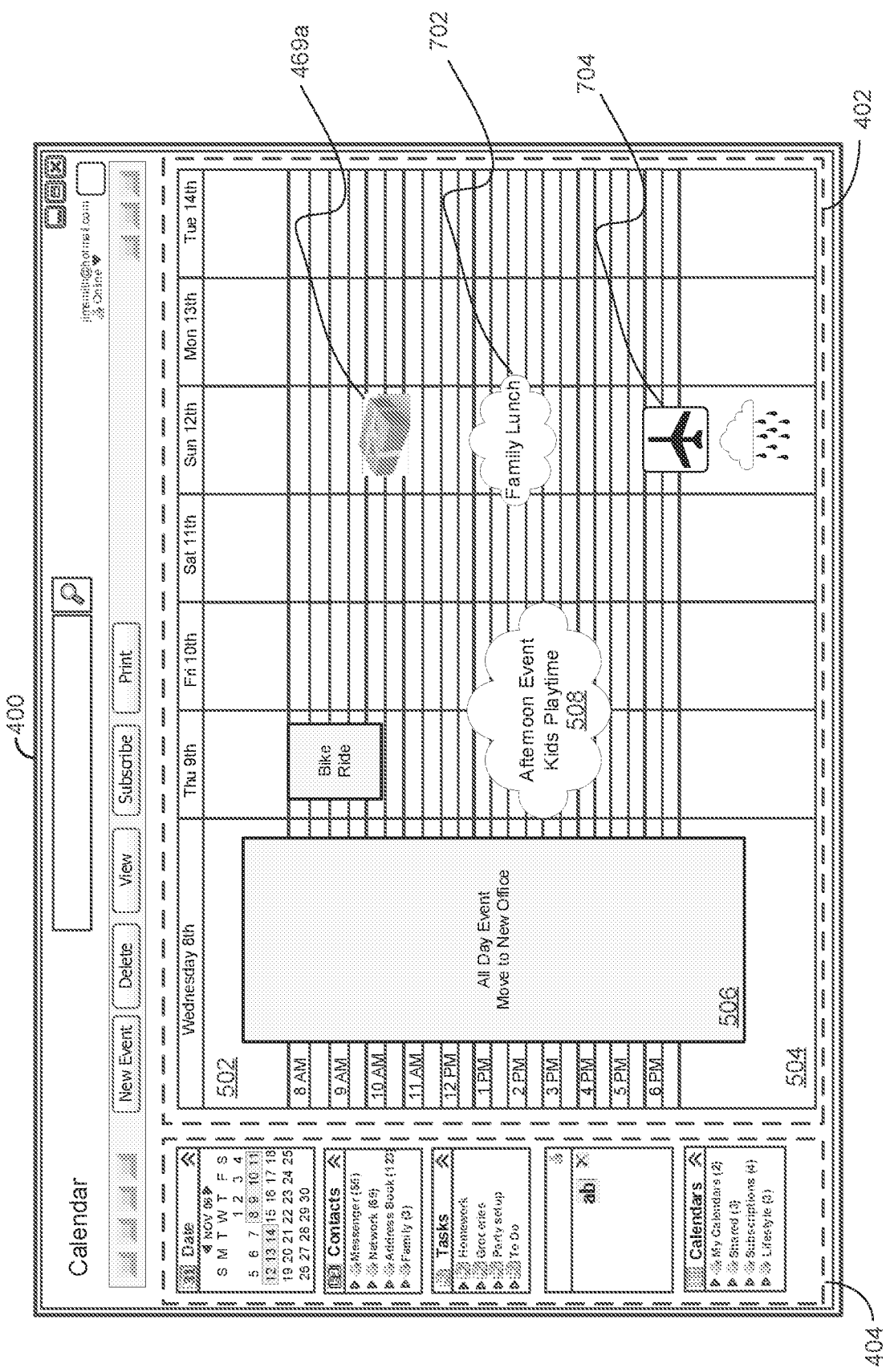
FIG. 9A illustrates the graphical user interface of FIG. 5A modified to show additional icons placed on the calendar to represent several different events.

Because the time frame is approximate, a non-rectangular border is used to enclose the icon representing the event. For example, with reference to FIG. 9A, icon 702 is associated with the event "Family Lunch" and includes a non-rectangular border, such as a cloud shape. Further, cloud 702 is placed onto the calendar between the specified time frame of Dad's Birthday Party (icon 469a) and the specified time frame of Travel to NY (icon 704).

Figure 9B:
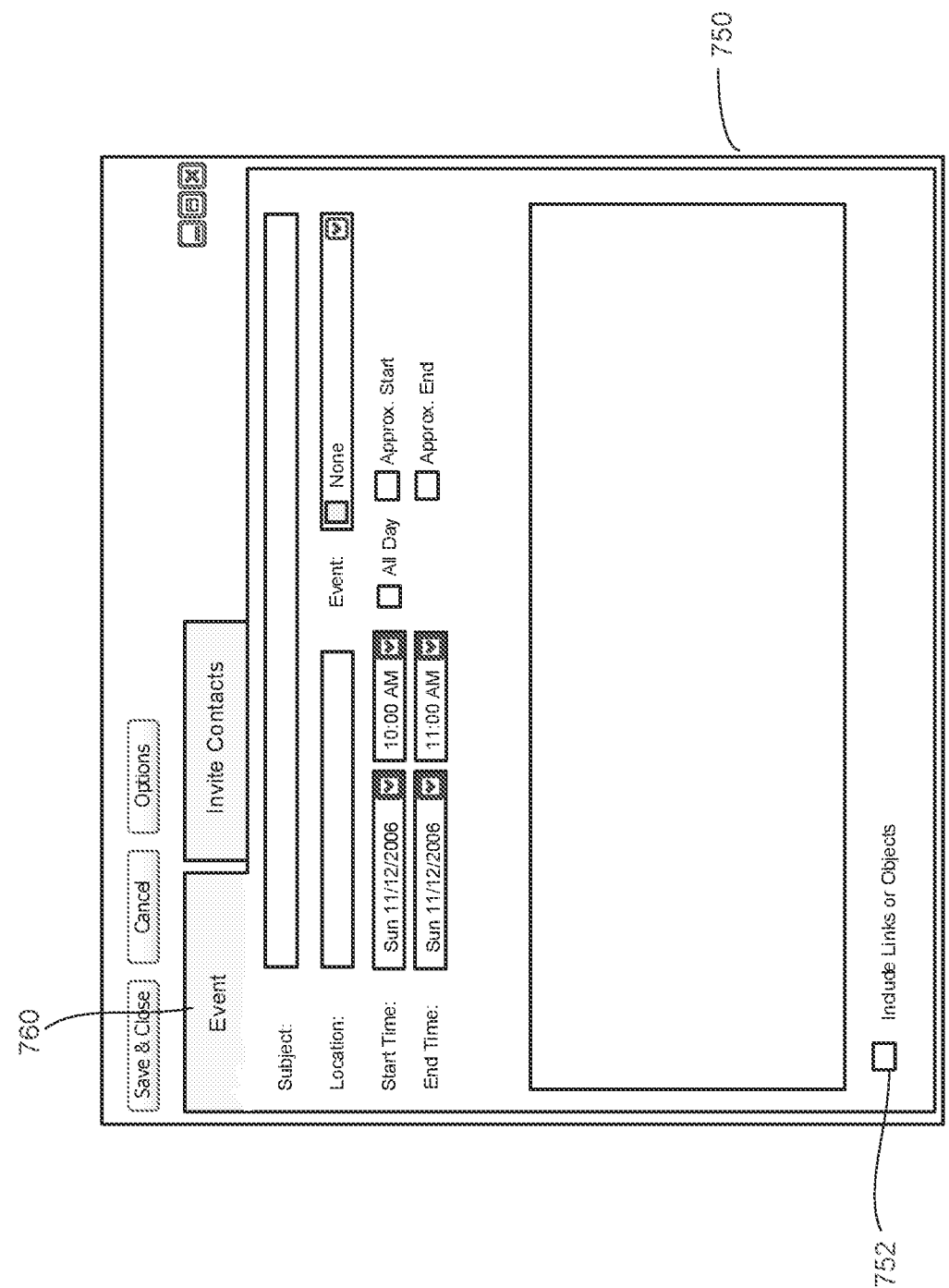
FIG. 9B illustrates an embodiment of a pop-up window that appears over the graphical user interface of FIG. 9A when the user chooses to link other multimedia content.
Figure 9C:
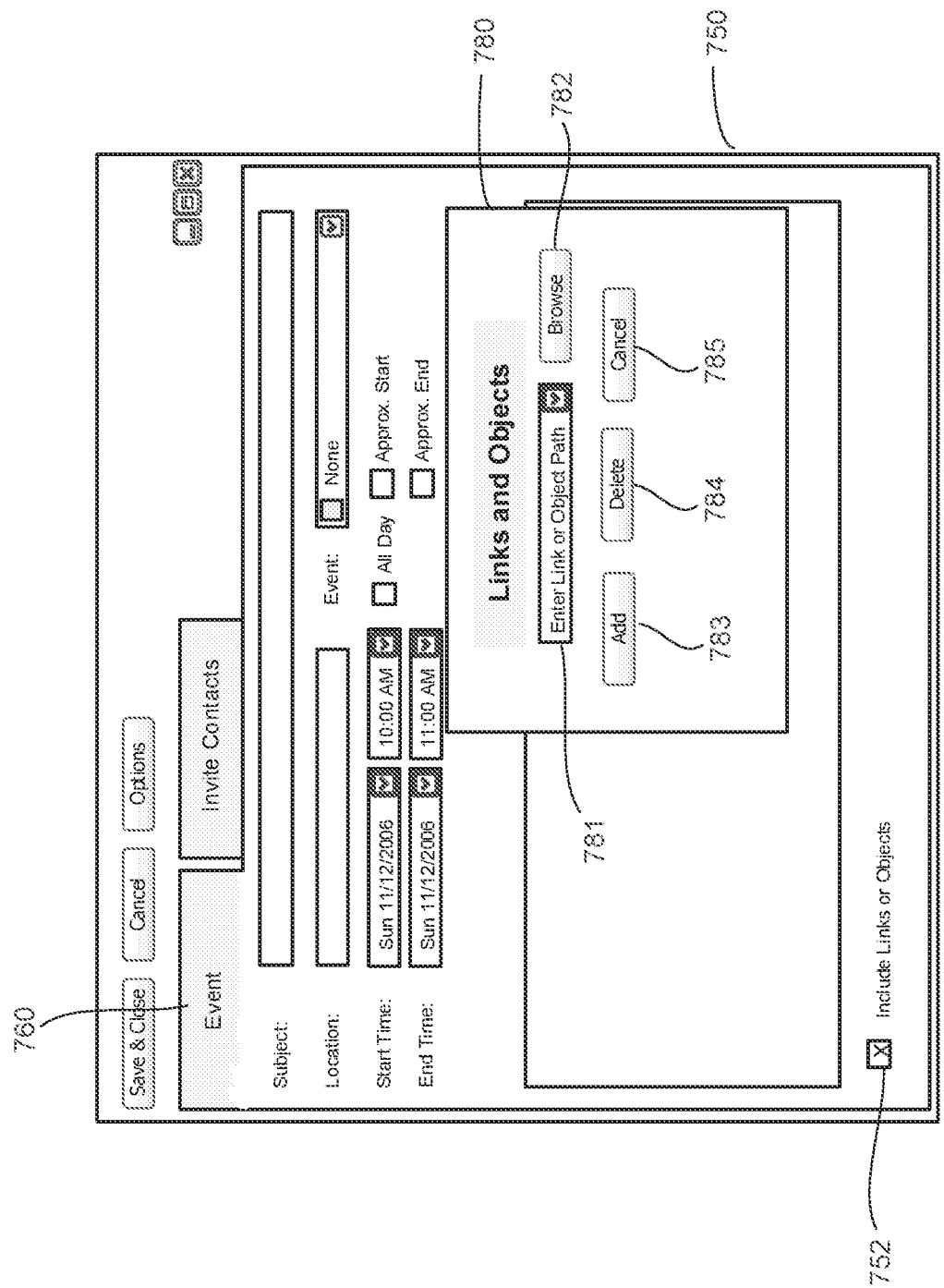
FIG. 9C illustrates an embodiment of a pop-up window that appears over the pop-up window of FIG. 9B to enable the user to link other multimedia content.

Advantageously, other multimedia objects could be associated with an event. For example, as shown in the embodiment of FIG. 9B, new event window 750 could include a check box 752, and when checked, a new window 780 pops up over the new event window 750, as shown in FIG. 9C. Widgets in the new window 780 include data field 781, button 782 adjacent to the data field labeled "Browse," button 783 labeled "Add," button 784 labeled "Delete," and button 785 labeled "Cancel." The user may enter the link or path name directly into data field 781, or may use the Browse button 782 to locate the desired content. The content may then be uploaded by the user and added to the event by selecting button 783, or deleted from the event by selecting button 784. Interactive gadgets could also be linked. For example, on FIG. 9A, icon 704 represents the event "Travel to NY," but an interactive gadget could also be linked to this event such that details of the travel, such as seat assignment, could be reviewed and possibly changed. Many other types of interactive gadgets, such as a movie or concert gadget that lets you buy tickets to a show, could be specified and incorporated onto the calendar representation.

The user could also relate the approximate time frame of a new event to a specific time frame, rather than to another event. For example, suppose the user again selects "After" from pull down menu 681 in FIG. 8B. However, instead of choosing "Event" from pull down menu 682, the user now chooses "Time." Field 683 may expand to show a calendar and clock times, and the user may select date and time as desired in well known manner.

Figure 10A:
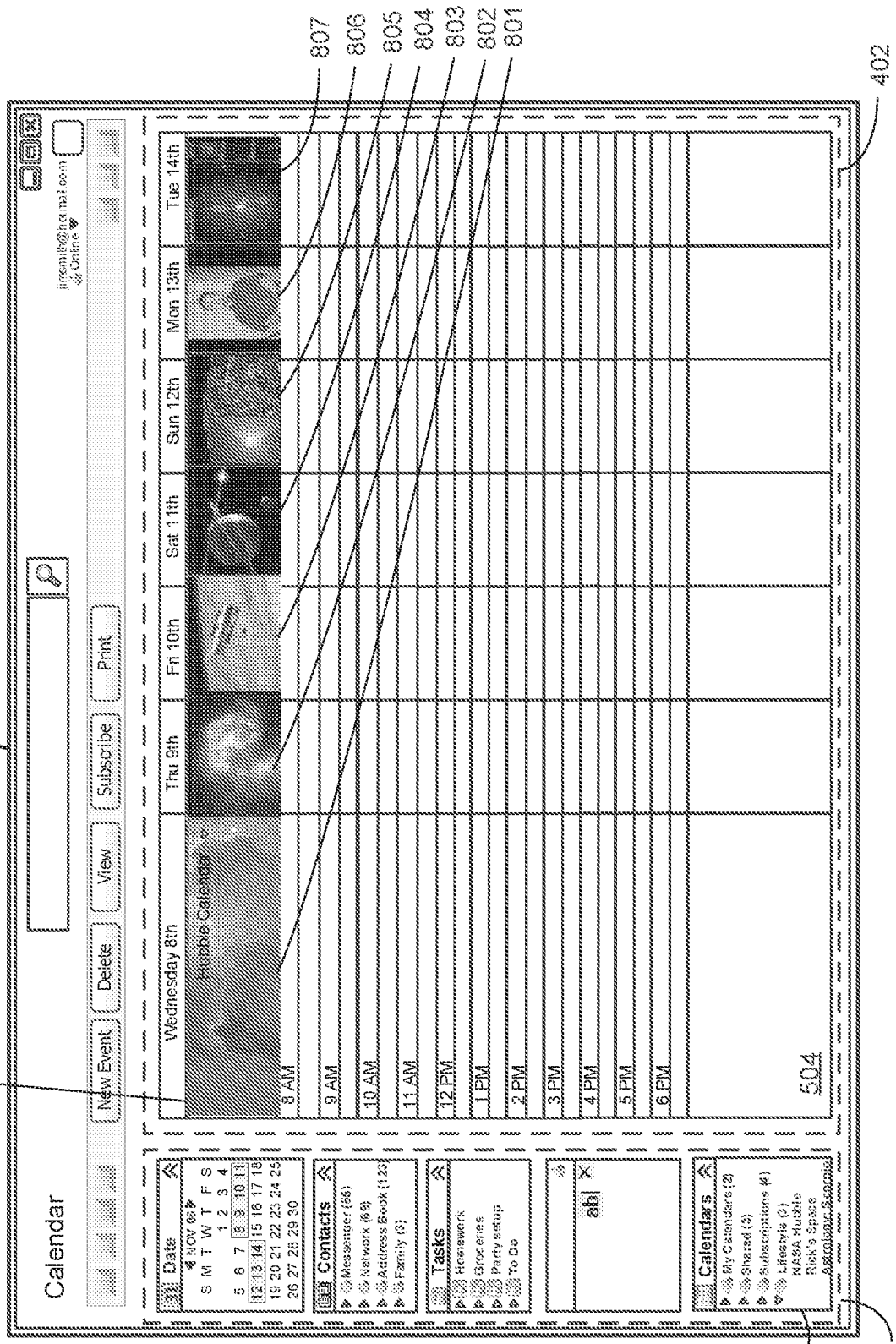
FIGS. 10A-10B illustrate the graphical user interface of FIG. 5A modified to show multimedia content linked to the calendar representation.
Figure 10B:
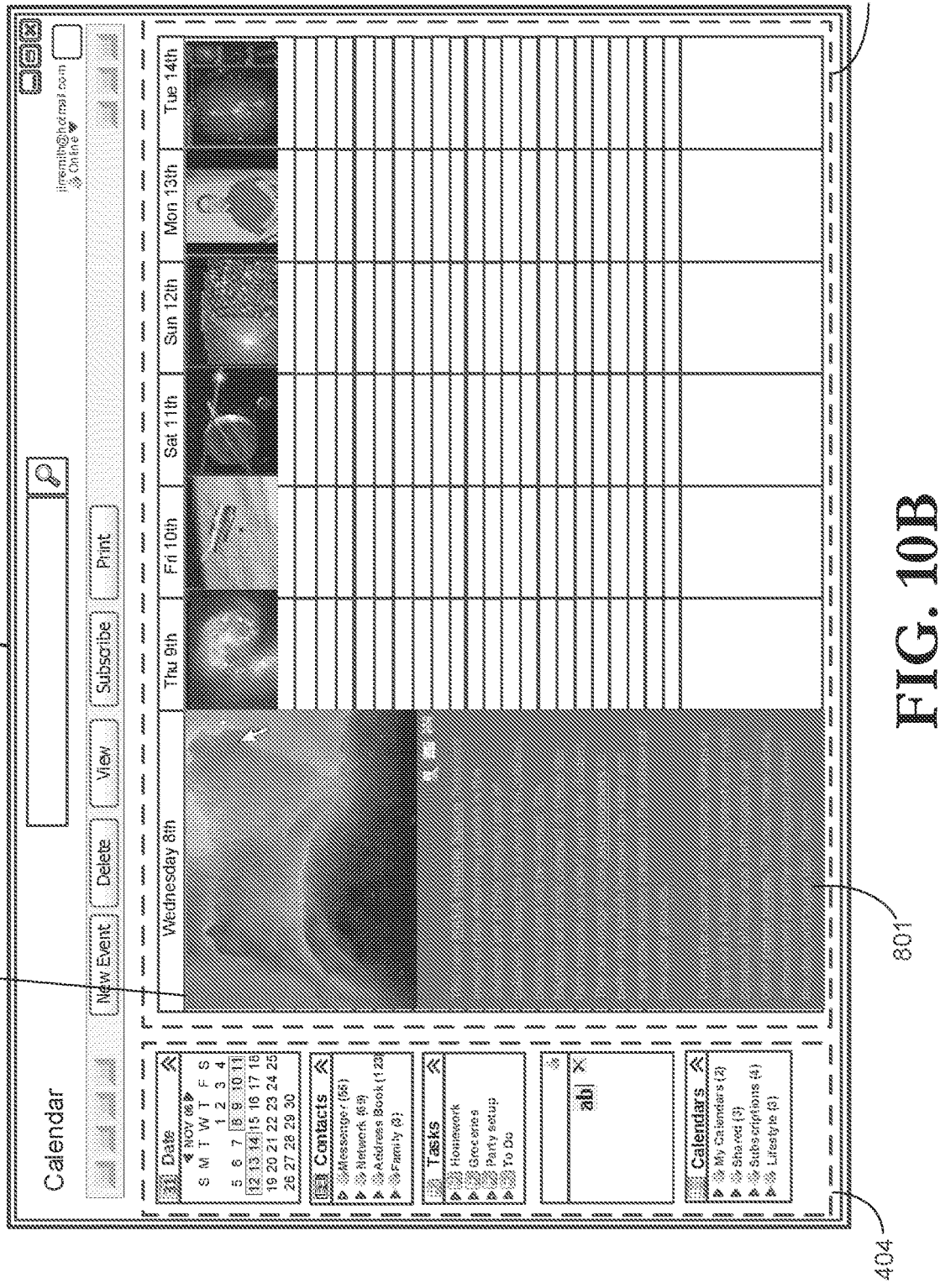

Referring now to FIGS. 10A-10B, streaming content, such as syndicated RSS feeds, can also be incorporated into the calendar. For example, calendar module 414 in the sidebar window 404 may define other calendars, such as NASA Hubble, that links streaming image content from another location, such as the NASA web site. When the user chooses to display the NASA Hubble calendar, the streaming content is linked to the header 502 of each day on the calendar representation. Thus, in FIG. 10A, streaming images 801-807 are displayed in respective headers 502 for each day. Advantageously, double clicking on the image in the header expands the image to take over the entire day on the calendar representation so that additional content can be provided. For example, as shown in FIG. 10B, image 801 has been expanded to reveal text that may describe the image. Further, hyperlinks may be provided in the text to link to other content.

It should be evident that any type of content could be linked to an event, or to the calendar itself. Further, content may be linked in different ways dependent on the type of content. For example, content of general interest having a temporal characteristic, such as news feeds, weather reports, task lists, etc., may be linked to specific or approximate time frames on the calendar representation, or to header or footer areas of the calendar, while topical content, such as a blog updates, birthday party guest list, may be linked to a specific event.

Figure 11A:
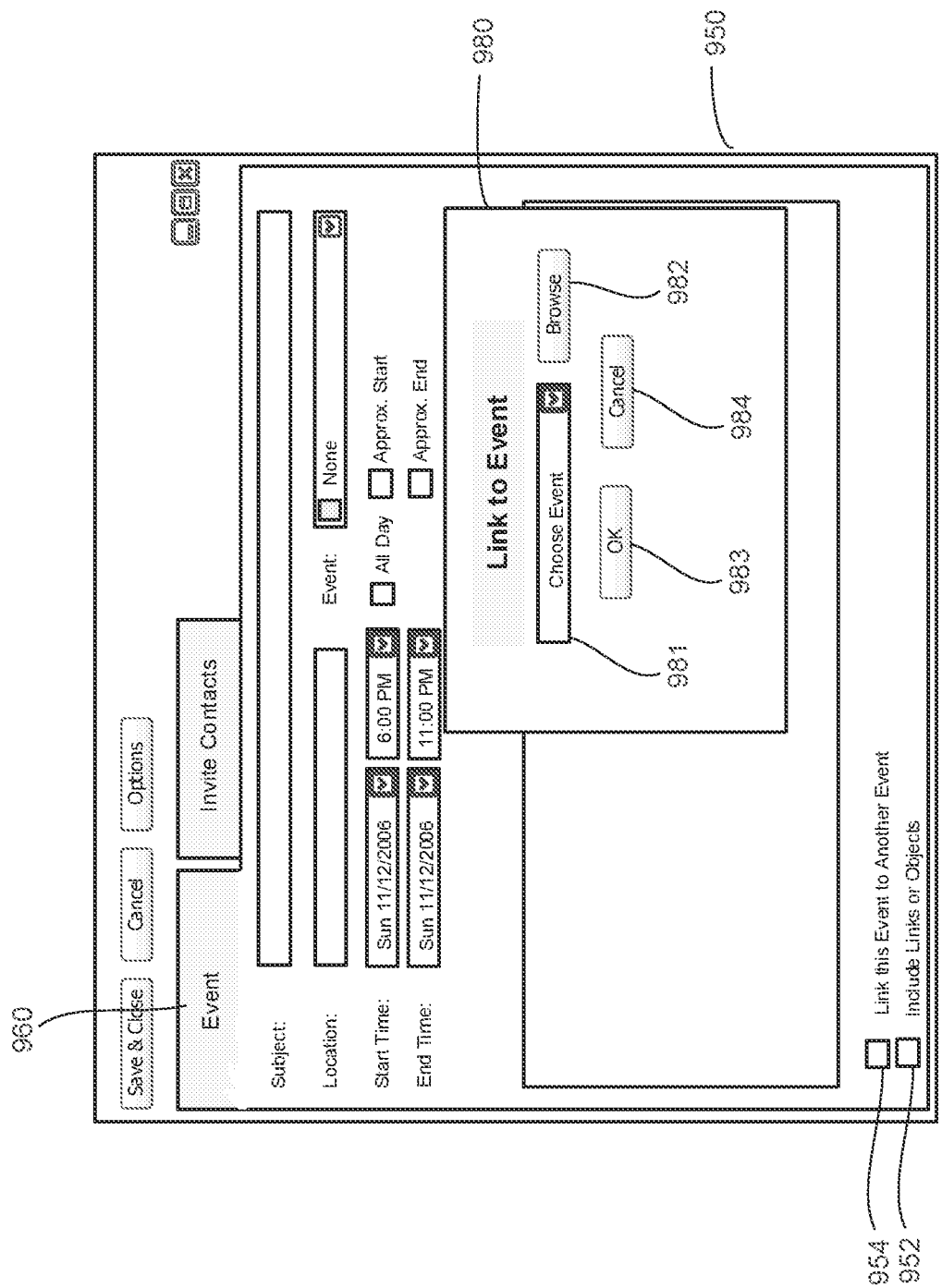
FIG. 11A illustrates an embodiment of a pop-up window that that allows the user to link other events.

In one embodiment, an event could also include subsections that provide content or links to content for related items. For example, a travel itinerary may include several distinct aspects, such as shuttle to airport, airplane flight, obtaining rental car, hotel accommodations, weather forecast, and points of interest in NY. Thus, an event called "Travel to NY" may be defined to include multiple subsections that provide content related to each of the different aspects of the event. Each of these sub-sections can be indicated by a separate icon placed onto the main event icon. FIG. 11A shows an embodiment having new event window 950, which includes buttons 952 and 954. Button 952 functions like check box 752 in FIG. 9C, and when pressed, window 780 (see FIG. 9C) pops up so that the user may link other content. Button 954 is labeled "Link this Event to Another Event." Pressing button 954 causes a new pop up window 980 to appear over the new event window 950, as shown. Window 980 includes widgets such as data field 981, button 982 adjacent to the data field labeled "Browse," button 983 labeled "OK," and button 984 labeled "Cancel." The user may choose a previously defined event from a list in data field 981, or may use the Browse button 982 to locate and upload the desired event. The content may be added to the event by selecting the OK button 983.

Figure 11B:
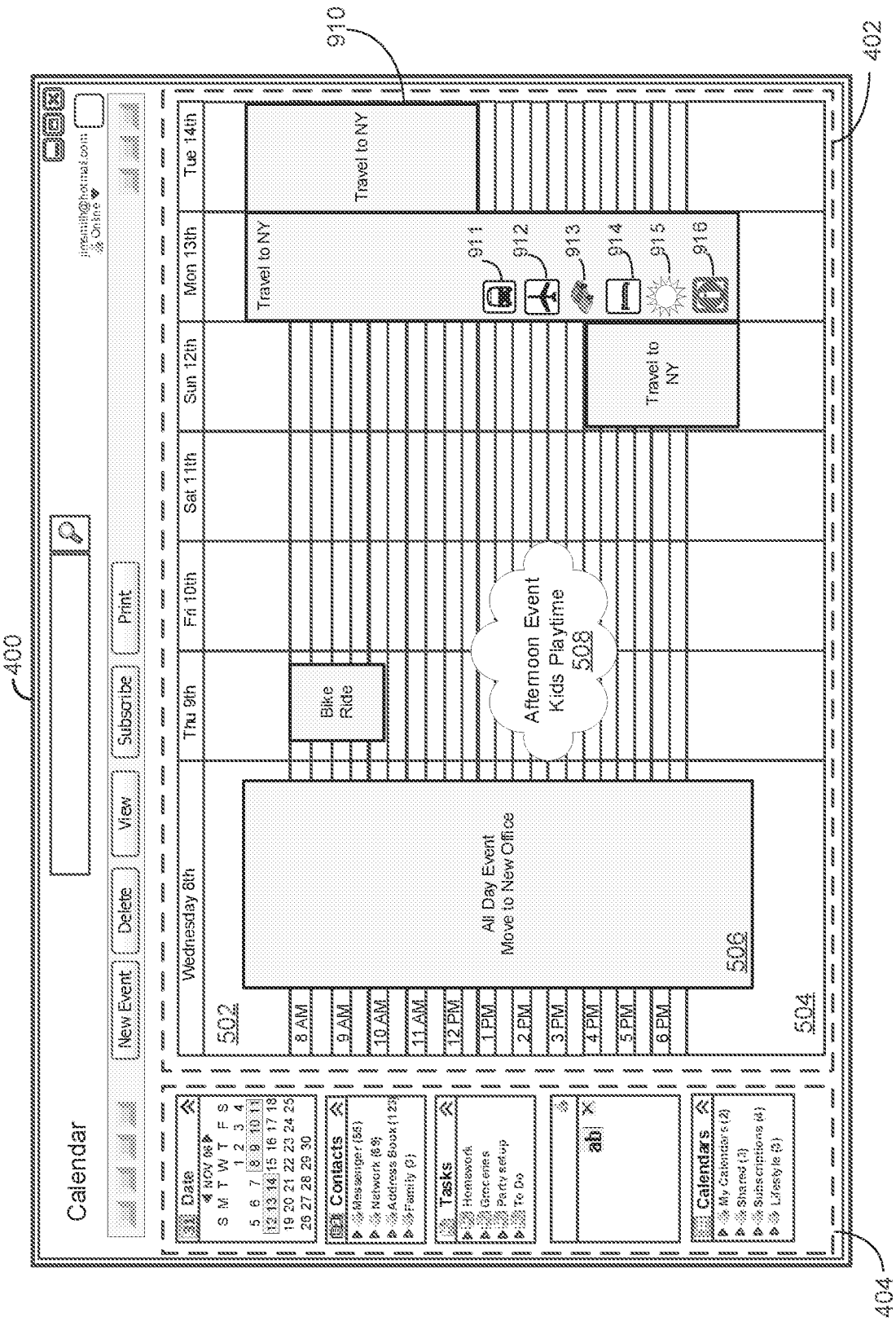
FIG. 11B illustrates a graphical user interface modified to show sub-events linked to a main event.

FIG. 11B shows a calendar having a defined event 910 entitled "Travel to NY." As noted above, this event includes multiple aspects that have separate content associated with each aspect. Thus, icons 911-916 are incorporated onto the event 910, and clicking on any of these icons will cause that sub-event and all related content to be active and visible. For example, icon 911 is an image of a shuttle bus, and this sub-event may contain all the details regarding the reservation for a shuttle bus to the airport, including any linked content. Icon 912 is an image of an airplane, and this sub-event may contain all the details regarding the airline reservation, including any linked content. Icon 913 is an image of a car, and this sub-event may contain all the details regarding the rental car reservation, including any linked content. Icon 914 is an image of a bed, and this sub-event may contain all the details regarding the hotel reservation, including any linked content. Icon 915 is an image of the sun, and this sub-event may contain all the details regarding the weather forecast in NY for the travel period, including any linked content. Icon 916 is an information symbol, and this sub-event may contain details and links regarding points of items in NY.

As previously noted, FIG. 1 illustrates an exemplary networked or distributed environment, with a server in communication with computer-based devices via a network. In more detail, a number of servers 60a, 60b, etc., may be interconnected via the communications network 70, which may be a LAN, WAN, intranet, the Internet, etc., along with a number of client or remote computing devices, such as PDA 110a, desktop computer 110b, and other client or remote computing devices such as devices 110c, 110d, 110e, etc. It is contemplated, however, that the present disclosure may apply to any computing device in connection with which it is desirable to implement advanced event management techniques as disclosed herein.

In a network environment in which the communications network 70 is the Internet, for example, the servers 60a, 60b, etc., can be Web servers with which the client devices 110a, 110b, 110c, 110d, 110e, etc., communicate via any of a number of known protocols, such as HTTP. Servers 60a, 60b, etc., may also function as client devices, as may be characteristic of a distributed computing environment.

Communications may be wired or wireless, where appropriate. Client devices 110a, 110b, 110c, 110d, 110e, etc. may or may not communicate via communications network 70, and may have independent communications networks or protocols associated therewith. Each client computer 110a, 110b, 110c, 110d, 110e, etc. and server computer 60a, 60b, etc. may be equipped with various application program modules and with suitable connections or access to storage elements or objects, across which files or data streams may be stored or to which portion(s) of files or data streams may be downloaded or transmitted. Any one or more of the computing devices 60a, 60b, 110a, 110b, etc. may be responsible for the maintenance and updating of a database 62 or other storage element, such as memory for storing data processed according to techniques of the present disclosure. Thus, the present disclosure can be utilized in a computer network environment having client computers 110a, 110b, etc. that can access and interact with a computer network 70 and server computers 60a, 60b, etc. that may interact with client computers 110a, 110b, etc. and other like devices, and one or more databases 62.

FIG. 2 and the following discussion are intended to provide a brief general description of a suitable computing environment in connection with which the systems and processes of the present disclosure may be implemented. It should be understood, however, that handheld, portable, desktop, and other computing devices of all kinds are contemplated for use in connection with the present disclosure, i.e., anything that interfaces with an event management application, such as a calendar. While a general purpose computer is described below, this is but one example, and the present disclosure may be implemented with a thin client or other gadget having network/bus interoperability and interaction. Thus, the systems and techniques of the present disclosure may be implemented in an environment of networked hosted services in which very little or minimal client resources are implicated, e.g., a networked environment in which the client device serves merely as an interface to the network/bus, such as an object placed in an appliance. In essence, anywhere that calendars may be stored, maintained, or shared, is a desirable or suitable environment for operation of the calendaring techniques in accordance with this disclosure.

Although not required, the systems and processes of this disclosure can be implemented via an operating system, for use by a developer of services for a device or object, and/or included within application software that operates in connection with the event management systems and processes of the disclosure. Software may be described in the general context of computer-executable instructions, such as program modules, being executed by one or more computers, such as client workstations, servers, gadgets, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the techniques of this disclosure may be practiced with other computer system configurations and protocols. Other well known computing systems, environments, and/or configurations that may be suitable for use with the disclosure include, but are not limited to, personal computers (PCs), server computers, hand-held or laptop devices, multiprocessor systems, microprocessor-based systems, programmable consumer electronics, network PCs, appliances, lights, environmental control elements, minicomputers, mainframe computers and the like. The systems and processes described herein may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

With reference to FIG. 2, an exemplary system for implementing the event management systems and processes described herein includes a general purpose computing device in the form of a computer 110. For example, PDA 110a, desktop computer 110b, or any of the devices illustrated in FIG. 1 could be implemented as shown for computer 110. Components of computer 110 may include, but are not limited to, a processing unit 120, a system memory 130, and a system bus 121 that couples various system components including the system memory to the processing unit. The system bus 121 may be any of several types of common bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile storage, and removable and non-removable media implemented in any method or technology, for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the disclosed ranking techniques may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A device for managing events on an electronic calendar, the device comprising:
a processor;
a network connection device coupled to the processor;
a display device coupled to display calendar information processed by the processor; and
a storage device coupled to the processor, the storage device for storing electronic calendar data and for storing instructions for execution by the processor for performing operations comprising:
generating a calendar icon for selection by a user of the device via the display device;
generating a calendar view for display responsive to selection of the first calendar icon, wherein the calendar view includes an event creation icon;
generating a first event data entry view, wherein the first event data entry view provides for selection of a first event detail;
receiving a first event detail via user interaction with the first event data entry view;
generating a second event data entry view, wherein the second event data entry view provides for selection of a second event detail, the second event detail corresponding to scheduling the event during one of several general times of day;
receiving a second event detail via user interaction with the second event data entry view;
generating a third event data entry view that provides for selection of a third event detail, the third event detail corresponding to selection of a type of event;
receiving a third event detail via user interaction with the third event data entry view;
identifying a graphic image associated with the third event detail, wherein the graphic image is representative of the third event detail;
buffering the first, second, and third event details in the storage device;
generating a save event icon for saving the first, second, and third event details; and
using the network connection device to store the first, second, and third event buffered details in remote storage responsive to selection of the save event icon.

2. The device of claim 1 wherein the first event detail comprises an event length of time.

3. The device of claim 1 wherein one of several general times of day of the second event details comprises one of morning, afternoon, and evening.

4. The device of claim 1 wherein the first, second, and third event details are stored as multimedia object.

5. The device of claim 4 and further comprising providing the user an option to share access to the multimedia object with other users.

6. The device of claim 4 and further comprising including a link in the multimedia object to other content.

7. The device of claim 1 and further comprising providing a pop-up window for selection of a detail for at least one of the first, second, and third event details.

8. A computer implemented method for managing events on an electronic calendar on a display of a device, the method including computer performed operations comprising:
generating a calendar icon for selection by a user of the device via the display device;
generating a calendar view for display responsive to selection of the first calendar icon, wherein the calendar view includes an event creation icon;
generating a first event data entry view, wherein the first event data entry view provides for selection of a first event detail;
receiving a first event detail via user interaction with the first event data entry view;
generating a second event data entry view, wherein the second event data entry view provides for selection of a second event detail, the second event detail corresponding to scheduling the event during one of several general times of day;
receiving a second event detail via user interaction with the second event data entry view;
generating a third event data entry view that provides for selection of a third event detail, the third event detail corresponding to selection of a type of event;
receiving a third event detail via user interaction with the third event data entry view;
identifying a graphic image associated with the third event detail, wherein the graphic image is representative of the third event detail;
generating a save event icon for saving the first, second, and third event details; and
saving the first, second, and third event details in storage accessible by the device, responsive to selection of the save event icon.

9. The method of claim 8 wherein the first event detail comprises an event length of time.

10. The method of claim 8 wherein one of several general times of day of the second event details comprises one of morning, afternoon, and evening.

11. The method of claim 8 wherein the first, second, and third event details are stored as multimedia object.

12. The method of claim 11 and further comprising providing the user an option to share access to the multimedia object with other users.

13. The method of claim 11 and further comprising including a link in the multimedia object to other content.

14. The method of claim 8 and further comprising providing a pop-up window for selection of a detail for at least one of the first, second, and third event details.

15. The method of claim 8 and further comprising buffering the first, second, and third event details in the storage device prior to saving in the storage.

16. A storage device having computer instructions stored thereon that when executed by a computer processor of a user device that includes a display device, cause the processor to perform operations comprising:
generating a calendar icon for selection by a user of the user device via the display device;
generating a calendar view for display responsive to selection of the first calendar icon, wherein the calendar view includes an event creation icon;
generating a first event data entry view, wherein the first event data entry view provides for selection of a first event detail;
receiving a first event detail via user interaction with the first event data entry view;
generating a second event data entry view, wherein the second event data entry view provides for selection of a second event detail, the second event detail corresponding to scheduling the event during one of several general times of day;

receiving a second event detail via user interaction with the second event data entry view;

generating a third event data entry view that provides for selection of a third event detail, the third event detail corresponding to selection of a type of event;

receiving a third event detail via user interaction with the third event data entry view;

identifying a graphic image associated with the third event detail, wherein the graphic image is representative of the third event detail;

generating a save event icon for saving the first, second, and third event details; and saving the first, second, and third event details in storage accessible by the device, responsive to selection of the save event icon.

17. The storage device of claim 16 wherein the first event detail comprises an event length of time and wherein one of several general times of day of the second event details comprises one of morning, afternoon, and evening.

18. The storage device of claim 16 wherein the storage is shared and the first, second, and third event details are saved as a multimedia object, and wherein the operations further comprise providing the user an option to share access to the multimedia object with other users.

19. The storage device of claim 16 wherein the operations further comprise providing a pop-up window for selection of a detail for at least one of the first, second, and third event details.

20. The storage device of claim 16 and further comprising buffering the first, second, and third event details in the storage device prior to saving in the storage.

\* \* \* \* \*